United States Patent
Kindt

(10) Patent No.: US 7,099,056 B1
(45) Date of Patent: Aug. 29, 2006

(54) AUTOMATICALLY BALANCED EXPOSURE TIME AND GAIN IN AN IMAGE SENSOR

(75) Inventor: Willem Johannes Kindt, Sunnyvale, CA (US)

(73) Assignee: Eastman Kodak Company, Rochester, NY (US)

( * ) Notice: Subject to any disclaimer, the term of this patent is extended or adjusted under 35 U.S.C. 154(b) by 882 days.

(21) Appl. No.: 10/255,252

(22) Filed: Sep. 25, 2002

Related U.S. Application Data

(63) Continuation-in-part of application No. 10/115,650, filed on Apr. 3, 2002, now Pat. No. 7,038,820.

(51) Int. Cl.
*H04N 1/46* (2006.01)

(52) U.S. Cl. ............... 358/509; 358/518; 358/475; 382/274; 382/275; 348/96

(58) Field of Classification Search .......... 358/509, 358/518, 475, 96; 382/274, 168, 275, 284, 382/135
See application file for complete search history.

(56) References Cited

U.S. PATENT DOCUMENTS

2005/0254723 A1* 11/2005 Wu .................. 382/274

OTHER PUBLICATIONS

Hon-Sum Wong, "Technology and Device Scaling Considerations for CMOS Imagers," *IEEE Transactions on Electron Devices*, vol. 43, No. 12, Dec. 1996, pp. 2131-2142.
Eric R. Fossum, "CMOS Image Sensors: Electronic Camera-On-A-Chip," *IEEE Transactions on Electron Devices*, vol. 44, No. 10, Oct. 1997, pp. 1689-1698.
Yawcheng Lo, "Solid-State Image Sensor: Technologies and Applications," SPIE Conference on Input/Output and Imaging Technologies, Taipei, Taiwan, Jul. 1998, *SPIE* vol. 3422, pp. 70-80.

* cited by examiner

*Primary Examiner*—Douglas Q. Tran
*Assistant Examiner*—Negussie Worku
(74) *Attorney, Agent, or Firm*—Peyton C. Watkins

(57) ABSTRACT

An automatic exposure system is arranged to dynamically adjust the exposure time and gain of a pixel array in an imaging system. A selected group of pixels from the pixel array are evaluated while the pixel array is exposed to light that is reflected from a scene. The signal levels associated with the selected pixels are compared to a dynamically adjusted exposure threshold level, while the current exposure time is compared to a dynamic adjusted exposure time limit. The exposure threshold level and exposure time limit are selected using a method that is optimized for lower noise and less blur in the resulting image. The optimization method includes an optimal exposure method, an extrapolative method, an iterative method, and an alternative iterative method. The optimization methods are arranged to find an optimum balance between exposure time and gain such that noise and motion blur are minimized in the resulting image.

25 Claims, 24 Drawing Sheets

AUTOMATICALLY BALANCED EXPOSURE TIME AND GAIN IN AN IMAGE SENSOR

RELATED APPLICATION

The patent application claims the benefit under 35 U.S.C. § 120 of the filing date for U.S. patent application Ser. No. 10/115,650, which was filed on Apr. 3, 2002 now U.S. Pat. No. 7,038,820.

FIELD OF THE INVENTION

The present invention relates to image sensing pixel cells. More particularly, the present invention is related to automatically balancing the exposure time and gain for an image on an image sensing pixel array. The present invention is arranged for use with an active or passive (ambient) light source. Also, the present invention may be arranged for use with a mechanical or an electronic based shutter control.

BACKGROUND OF THE INVENTION

A typical film-type camera includes a mechanical shutter. Light is reflected off of a scene from either artificial or natural light conditions. The camera receives the reflected light when the mechanical shutter is opened. While the shutter is opened, the reflected light is focused on a film that contains light sensitive components. The light sensitive components of the film create a chemical recording of the received light. The image, or scene, that is recorded on the film corresponds to the total amount of light that directed onto the film during exposure to the reflected light. The total amount of light directed onto the film is related to the aperture of the shutter, and the exposure time. The exposure time of the film corresponds to the length of time that the mechanical shutter is open. The exposure time is a fixed time interval that is manually adjusted by an operator.

Digital cameras are similar to film-type cameras in that light is reflected off of the scene and received by a light sensitive component when the shutter is open. The light sensitive component may be a charge coupled device (CCD), or a complementary metal oxide semiconductor (CMOS) device. The image sensors convert light into electronic signals when exposed. The signals are provided to an image processor to store the image of the recorded scene. In digital cameras, the shutter may be a mechanical shutter that is similar to that found in the film-type camera, or an electronic shutter mechanism.

A typical image sensor includes an array of image capturing points, or pixels. Each pixel is arranged to provide a signal that is responsive to light. The signal level that is provided by each pixel is related to the intensity of the light that is received, and the length of time that the pixel is exposed. A CMOS array is arranged in rows and columns that may be read individually, while a CCD array typically provides a serial read out of the electronic signals. The electronic signals are typically converted into digital signals that are stored in a memory circuit, such that the digitized image is captured.

SUMMARY OF THE INVENTION

The present invention is related to an automatic exposure system and method. The automatic exposure system is arranged to dynamically adjust the exposure time and gain of a pixel array in an imaging system. A selected group of pixels from the pixel array are evaluated while the pixel array is exposed to light that is reflected from a scene. The signal levels associated with the selected pixels are compared to a dynamically adjusted exposure threshold level, while the current exposure time is compared to a dynamic adjusted exposure time limit. The exposure threshold level and exposure time limit are selected using a method that is optimized for lower noise and less blur in the resulting image. The optimization method includes an optimal exposure method, an extrapolative method, an iterative method, and an alternative iterative method. The optimization methods are arranged to find an optimum balance between exposure time and gain such that noise and motion blur are minimized in the resulting image.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal. The meaning of "a", "an", and "the" include plural references. The meaning of "in" includes "in" and "on".

The present invention is related to imaging systems that employ pixel arrays that require automatic adjustment of the exposure time of the pixel array. A subset of the pixels in the pixel array is repeatedly read to perform a sparse non-destructive readout of the pixel array to determine the preferred exposure time. The readout is said to be non-destructive since the signals in the pixel remain intact after the readout of the pixel signal is completed. Assuming a constant scene and a constant illumination, the signals inside the pixels will grow linearly with time. The pixels that receive little or no reflected light correspond to dark objects in the scene, while the pixels that receive greater reflected light correspond to bright objects in the scene. The pixels that receive reflected light from bright objects have corresponding signals that increase faster than the signals associated with a less bright reflection. At the end of the exposure cycle (or the integration time of the pixels), large output signals result from pixels exposed to bright areas and low output signals result from pixels that are exposed to dark areas.

The exposure of a pixel corresponds to the product of the integration time and the illumination level. The pixels in a bright scene will be overexposed when the exposure is too high such that the image details are lost in the bright areas. The pixels will be excessively dark when the exposure is too low such that the image details are lost in the dark regions of the image. The automatic exposure control means (or mechanism) in the present invention is arranged to ensure that the output signals of the pixels exposed to bright areas approach (or just reach) the maximum output signal level (or saturation level) at the end of the integration time. The exposure is interrupted when the largest output signal has reached the saturation level such that contrast in the image is improved. The exposure may be interrupted by any appropriate means, including but not limited to deactivating the light source, closing a mechanical shutter, and closing an electronic shutter.

First Exemplary Imaging System

Figure 1:
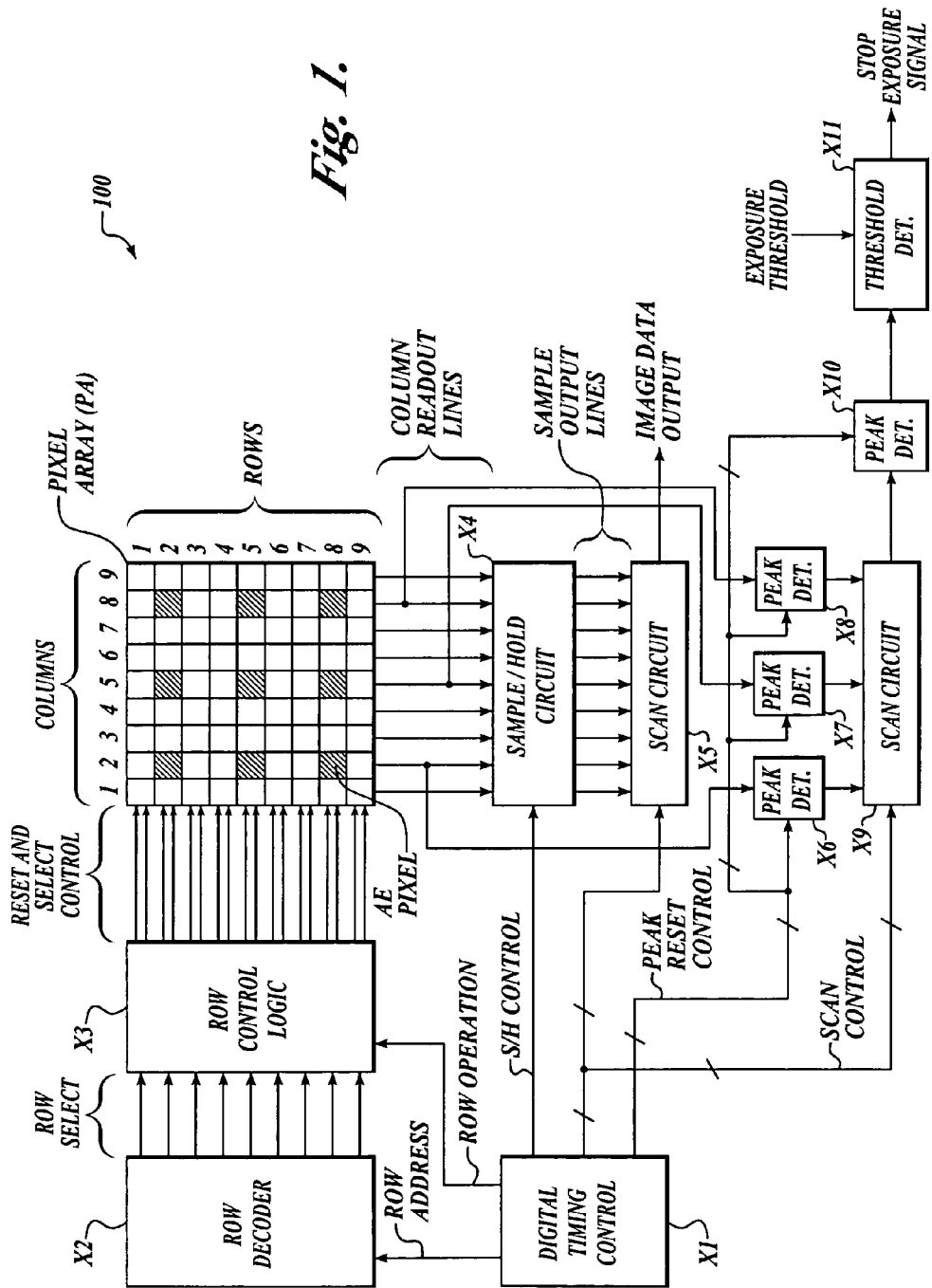
FIG. 1 is a schematic diagram of a first exemplary imaging system.

FIG. 1 shows an exemplary imaging system (100) that includes automatic exposure control that is arranged in accordance with the present invention. Imaging system 100 includes a pixel array (PA) that is configured as a nine by nine array of pixels that are arranged in columns and rows. The pixel array (PA) includes a selected group of pixels (AE pixels) that are used for automatic exposure control. As illustrated in FIG. 1, AE pixels are located in columns 2, 5, and 8, at rows 2, 5, and 8, respectively. Row reset lines are configured to reset a respective row in the pixel array. Row select lines are configured to select a respective one of the rows for readout. When a row select line is selected, each pixel in the selected row is coupled to a respective column readout line.

A digital timing control circuit (X1) provides a row address signal to a row decoder circuit (X2). The row decoder circuit (X2) provides row select signals in response to the row address signal. Each row select signal corresponds to one of the rows in the pixel array (PA). For example, a pixel array that has 128 rows will have 128 addressable rows, with 128 corresponding row select signals.

The digital timing control circuit (X1) provides a row operation control signal to a row control logic circuit (X3). The row control logic circuit (X3) provides the necessary control signals for the pixel array (PA) in response to the row select signals and the row operation control signal. In one example, the row operation signal cooperates with the row control logic circuit (X3) to select between resetting (or initializing) a row and selecting a row for output. For this example, each row of the pixel array (PA) is coupled to a row reset line and a row select line.

A sample/hold circuit (X4) is arranged to receive column outputs from the column readout lines of the pixel array (PA). The sample/hold circuit (X4) is arranged to provide one or more sample output lines, corresponding to the output (or outputs) of the sample/hold circuit (X4). The sample/hold circuit (X4) depicted in FIG. 1 includes separate sample and hold circuits (or means for sampling and holding) for each column readout line. A scan circuit (X5) is arranged to receive signals from the sample output lines, and provide an image data output signal. The image data output signal may be further processed for use in an analog-to-digital converter (ADC).

In one example, the sample/hold circuit (X4) includes a separate sample and hold means for each column. In another example, a single sample and hold means is selectively coupled to each of the columns, and the sample and hold means provides a serial output. Each sample and hold circuit may require one or more control lines such as reset, clocking lines, and the like. The digital timing control circuit (X1) is arranged to provide a S/H control signal to the sample/hold circuit (X4), which may include multiple control signals as may be necessary for a particular sample and hold circuit topology.

The scan circuit (X5) receives a scan control signal from the digital timing control circuit (X1), such that each sample output line is selectively provided to the image data output. The scan circuit (X5) may be implemented as a series of switches, with each sample output line having a corresponding scan switch, where the switches selectively couple the sample output lines to the image data output. The scan control signal may include multiple control signals as required by the implementation of the scan circuit (X5). For example, scan circuit (X5) and scan circuit (X9, see discussion below) may have separate scan control lines.

A group of peak signal detector circuits (X6–X8) are coupled to a selected group of column readout lines. The selected group of column readout lines corresponds to the selected group of pixels (AE pixels), as previously described above. For example, as illustrated in FIG. 1, peak signal detector circuits X6, X7, and X9 are coupled to the column readout lines for columns 2, 5, and 8, respectively. The peak signal detector circuits (X6–X8) are reset by a peak reset control signal that is provided by the digital timing control circuit. The peak signal detector circuits (X6–X8) store a value that corresponds to the peak signal level of the corresponding column readout line. Each time a selected column readout line changes, the corresponding peak signal detector circuit evaluates the signal. When the new column readout signal is greater than the currently stored value in the peak signal detector, the peak signal detector stores the new column readout. The peak signal levels of the pixel array are referenced with respect to the high power supply (VDD), such that the peak signal detector circuits store peak signal levels of the pixels. The pixel signal levels increase as they are exposed such that the difference between the high power supply (VDD) and the voltage associated with the pixel increases. Thus, as the exposure of the pixels increases, the absolute value of the column readout line voltage decreases, and the peak signal detectors detect the lowest voltage on the column readout line.

Another scan circuit (X9) is arranged to selectively couple each output from the group of peak signal detector circuits (X6–X8) to another peak signal detector circuit (X10) in response to a scan control signal. The scan circuit cooperates with the scan control signal such that only one of the peak signal detector outputs is coupled to the input of the other peak signal detector (X10). The other peak signal detector circuit (X10) is arranged to store the highest peak signal level of all of the peak signal detectors from the group of peak signal detector circuits, and is reset in response to the peak reset control signal. The peak reset control signal may include multiple peak reset control signals as required by the implementation of the peak signal detector circuits (X6–X8, X10). For example, each peak signal detector circuit may have a separate peak reset control signal, or peak signal detector circuits X6–X8 may have one peak reset control signal, while peak signal detector circuit X10 has another peak reset control signal.

A threshold detector circuit (X11) is arranged to receive the output from the other peak signal detector circuit (X10) and compare the peak signal level to an exposure threshold. The threshold detector circuit includes an output that is arranged to provide a stop exposure signal that indicates when the exposure threshold has been reached. The stop exposure signal is asserted when the output of any one of the scanned peak signal detector circuits (X6–X8), which are provided to the other peak signal detector circuit (X10), exceeds the exposure threshold.

Each pixel in the pixel array has a maximum and minimum signal level that corresponds to the total exposure of the pixel to light. In one example, a column readout line from the pixel array corresponds to a maximum voltage (e.g., VDD) when the pixel corresponds to a black level, and the pixel array corresponds to a minimum voltage (e.g., ground) when the pixel corresponds to a white level. The exposure time of the pixels in the pixel array should be adjusted such that none of the pixels exceed their saturation limit. The saturation limit for a given pixel in a pixel array corresponds to a condition where further exposure to light yields no change in signal provided by the pixel. For example, the voltage associated with one pixel in the array decreases when it is exposed by a bright light. In this example, the voltage cannot decrease below the minimum system voltage (e.g., ground), and further exposure to light will not result in a change in the image with respect to the exposed pixel. However, other pixels in the pixel array will also be exposed such that the total image will have poor contrast.

To improve the contrast in the image, no one pixel in the pixel array should reach total saturation (the point where further exposure results in no change in the image). Ideally, every pixel in the pixel array may be scanned (an entire frame) to determine when any one pixel reaches total saturation. However, scanning every pixel in the array may take a long time such that the first pixel scanned and the last pixel scanned are sufficiently far apart in time to create an overexposure condition in the array. For example, the first pixel scanned may be just below the saturation limit at the beginning of the scan, while at the end of the scan the pixel has already exceeded the saturation limit.

A selection of pixels (AE pixels) from the pixel array is sampled to determine an appropriate exposure time such that overexposure of the pixel array is avoided in real time. By sub-sampling the pixels in the pixel array, and determining when any one of the sub-sampled pixels approaches or reaches saturation, the preferred exposure time can be determined. As shown in FIG. 1, AE pixels are dispersed among the matrix of pixels in the pixel array. The AE pixels correspond to a group of pixels that will be sampled as the frame is processed. The AE pixels are arranged at particular locations in the pixel array such that parallel processing of the peak detection of the pixel array is possible. The exposure of the pixel array is halted when the exposure threshold is reached such that none of the scanned AE pixels in the pixel array exceed their saturation limit.

Each AE pixel is periodically evaluated by monitoring the signal readout corresponding to the particular pixel. The number of AE pixels that are evaluated in each frame determines the total processing time that is required to handle the frame. When evaluated individually, the processing time to evaluate the exposure of each AE pixel is determined by the access time to read each pixel individually. However, a particular AE pixel may become overexposed between adjacent time periods, resulting in loss of contrast and poor image quality. Parallel processing may be employed to reduce the overall latency in observing the AE pixels. Instead of individually evaluating each AE pixel by its corresponding row and column, an entire row of AE pixels are evaluated within the same row processing time interval. With parallel processing, the number of rows processed and the row processing time interval determines the total latency between observations for each AE pixel. Parallel processing reduces the possibility of overexposing an AE pixel between successive observations.

Exemplary 3-T Pixel Cell

Figure 2:
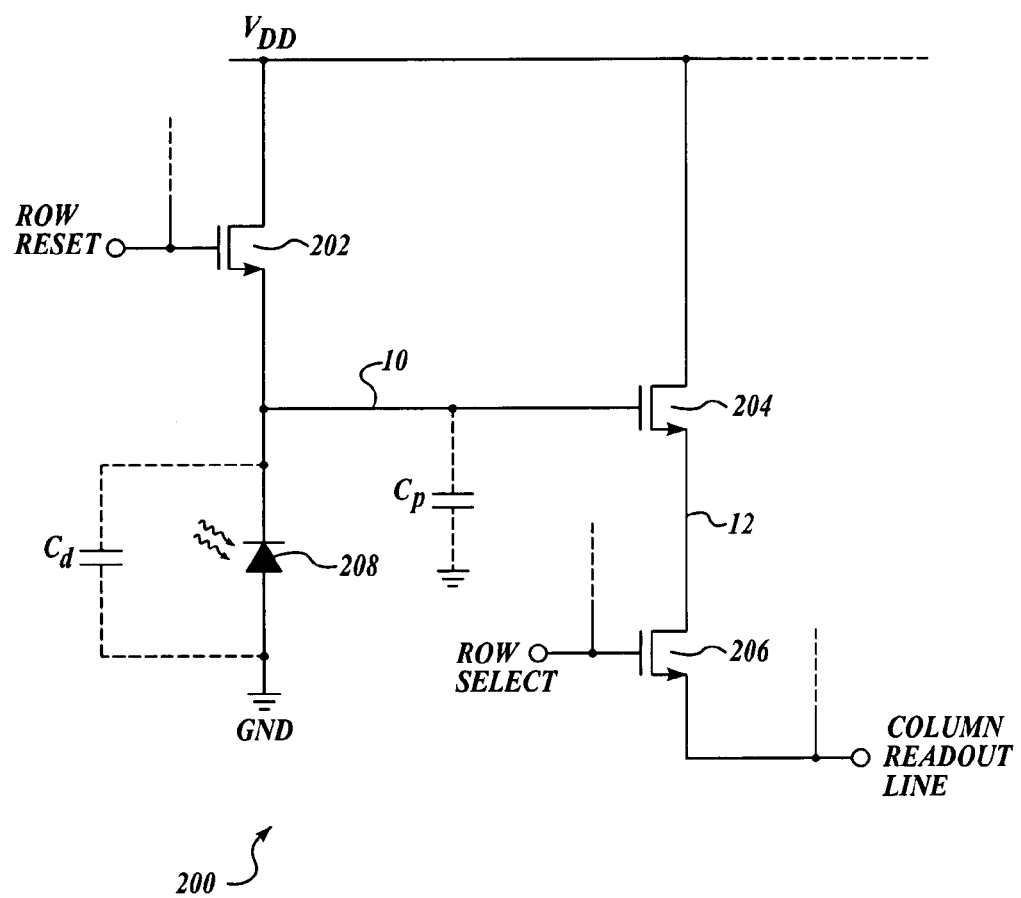
FIG. 2 is a schematic diagram of an exemplary pixel cell.

FIG. 2 is a schematic diagram of an exemplary pixel cell (200) from a pixel array that is arranged in accordance with the present invention. The pixel cell includes three transistors and will be hereinafter referred to as a 3-T pixel cell. The 3-T pixel cell includes a photodiode (208), and three NMOS transistors (202, 204, 206).

Transistor 202 has a gate that is coupled to a row reset signal, a drain that is coupled to a high power supply (VDD), and a source that is coupled to the photodiode at node 10. The photodiode has a cathode that is coupled to node 10 and an anode that is coupled to a low power supply (GND). Transistor 204 has a gate that is coupled to node 10, a source that is coupled to node 12, and a drain that is coupled to the high power supply (VDD). Transistor 206 has a gate that is coupled to a row select signal, a source that is coupled to a column readout line, and a drain that is coupled to node 12. Transistor 202 is arranged to reset the pixel cell when activated by the row reset signal. Transistor 204 operates as a source follower voltage that buffers the voltage from node 10. Transistor 206 is arranged to couple the output of the source follower (transistor 204) to the column readout line when activated by the row select signal.

The general operation of the 3-T pixel cell is as follows. A positive pulse is applied to the gate of transistor 202 so that a positive bias voltage is applied at the cathode of photodiode 208. The photodiode has an inherent depletion layer capacitance (Cd) that charges up while power is applied to the photodiode. After transistor 202 turns off, the photodiode 208 remains biased at the positive bias voltage because of the charge that is stored in its depletion layer capacitance (Cd). A photocurrent (Ip) will flow from the cathode to the anode of the photodiode when the photodiode receives photons (light). The photocurrent (Ip) discharges the photodiode's depletion layer capacitance (Cd) and causes the voltage across photodiode 208 to drop.

Stray and parasitic capacitances (Cp) are present on node 10 in pixel cell 200. The stray and parasitic capacitance (Cp) is substantially determined by the parasitic capacitance from the gate of transistor 204 (the source follower) and the parasitic capacitance from the source of transistor 202 (the reset transistor). The bias voltage that is initially applied to the photodiode is stored on the combination of capacitors Cp and Cd.

The photocurrent (Ip) is integrated on the depletion layer capacitance (Cd) along with the parasitic capacitance (Cp) during an integration time (Ti). The total charge that is integrated on the capacitance is determined by Ip*Ti. At the end of the integration interval, the output voltage (Vd) of the photodiode is decreased by an amount (Vs) that is determined by Vs=Ip*Ti/(Cd+Cp). Thus, the output voltage (Vd) of the photodiode is determined by Vd=Vi−Vs, where Vi is the initial voltage that is stored on capacitor Cd prior to applying light to the photodiode. Vs is described as the signal voltage, since it is related to the intensity of received light (Ip) and the length of the exposure time (Ti).

The output voltage (Vd) is applied to the gate of the transistor 204, which operates a source follower, such that the signal at node 12 corresponds to (Vd−Vt), where Vt is the threshold voltage of transistor 204. A positive pulse is applied to the gate of transistor 206 (the row select transistor) via the row select signal such that the readout voltage (Vd−Vt) is coupled to the column readout line at the source of transistor 206. The column readout line receives a readout voltage that is related to the output voltage (Vd) of the photodiode by an offset voltage. The offset voltage corresponds to the threshold voltage (Vt) of transistor 204. The sample/hold circuit from FIG. 1 may be arranged to correct for the offset that is created by the source follower (transistor 204). In one example, the sample/hold circuit may be arranged as a correlated double sampling (CDS) circuit.

A correlated double sampling circuit is used to reduce the fixed pattern noise that would otherwise be introduced by the source follower (transistor 204) inside the pixel cell (200). The voltage on the column readout line is one threshold voltage (Vt) below the voltage on the cathode of the photodiode (208). The source follower in each pixel cell may have a different threshold voltage, due to processing variations, parasitic effects as well as other sources of error. The variations in the threshold voltage (Vt) of the source follower can result in differences in the black levels for each individual pixel cell.

Prior to a first sampling interval, the photodiode (i.e., photodiode 208) in the pixel cell is exposed to light. The readout voltage (Vd−Vt) is sampled as a first sample voltage during the first sampling interval. The first sample voltage is determined by Vi−Vs−Vt, in which Vs is the signal voltage as defined above, Vi is the initialization voltage of the pixel after a reset, and Vt is the threshold voltage of the source follower (i.e., transistor 204). The photodiode (i.e., photodiode 208) is reset to the initialization voltage (Vi) at the conclusion of the first sampling interval. The readout voltage is sampled again as a second sample voltage during a second sampling interval. Since the photodiode has not been exposed to light, the second sample voltage is determined by (Vi−Vt). The signal voltage (Vs) is determined by subtracting the first sample voltage from the second sample voltage.

The maximum possible initialization voltage (or reset voltage) for photodiode 208 corresponds to the potential of the high power supply (VDD). However, the initialization voltage (Vi) is bounded by the threshold voltage (Vt) of transistor 202. In a system where the row reset signal corresponds to the high power supply voltage (VDD), the initialization voltage (Vi) corresponds to the difference between the high power supply voltage and the threshold voltage (VDD−Vt). The minimum detectable readout voltage from the column readout line is bounded by a current source (not shown) that is necessary to bias transistor 204 (the source follower), and the threshold voltage (Vt) of transistor 204. An exemplary current source that may be connected to the column readout line has a saturation voltage corresponding to Vsat. In this example, the minimum detectible signal corresponds to (Vt+Vsat), the maximum detectible signal corresponds to (VDD−Vt), and the maximum signal swing corresponds to the difference (VDD−2*Vt−Vsat).

The photodiode (208) may be reset to the potential of the high power supply (VDD) by using a charge pump circuit (not shown). The charge pump circuit is arranged to bring the voltage on the gate of transistor 202 above the high power supply voltage such that the photodiode (i.e, photodiode 208) is reset to the high power supply voltage (VDD). As described previously, the minimum detectable readout voltage from the column readout line is bounded by a current source (not shown) that is necessary to bias transistor 204 (the source follower), and the threshold voltage (Vt) of transistor 204. However, the maximum signal swing for a charge pump implementation corresponds to (VDD−Vt−Vsat).

Increased signal swing is beneficial in that it improves the dynamic range of the pixel cell. The dynamic range of the pixel cell is defined as the ratio between the maximum detectable signal level and the minimum detectable signal level. The maximum detectable signal level is related to the signal swing. The minimum detectable signal level is determined by the noise level of the pixel, which is usually dominated by kT/C reset noise. The dynamic range is related to the ability of the pixel cell to detect contrast details in both bright and dark regions of the image. For a pixel cell with a relatively low dynamic range, dark regions of the image may be underexposed, while bright regions of the image may be overexposed.

Exemplary 4-T Pixel Cell

Figure 3:
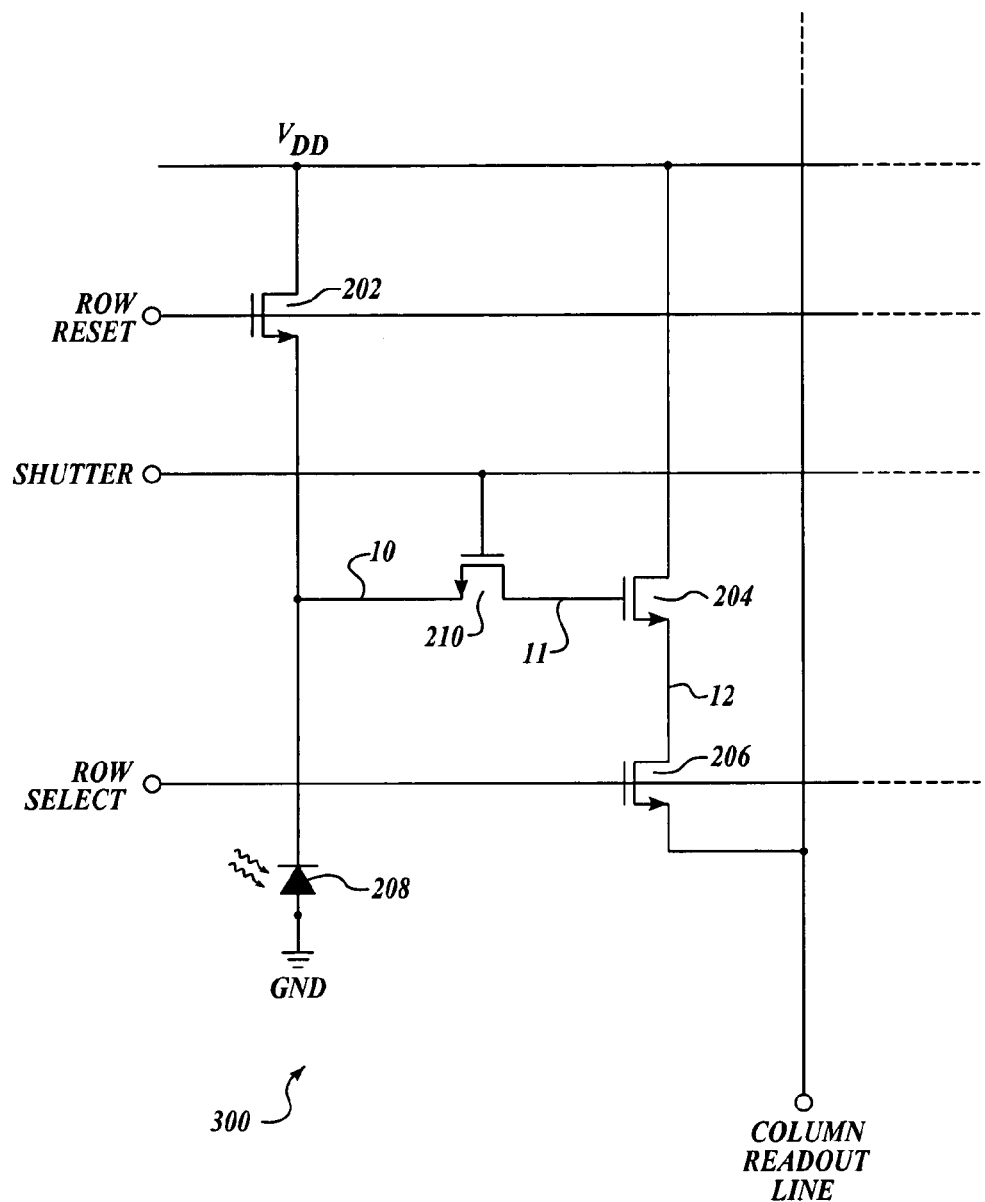
FIG. 3 is a schematic diagram for another exemplary pixel cell.

FIG. 3 is a schematic diagram of another exemplary pixel cell (300) from a pixel array that is arranged in accordance with the present invention. The pixel cell (300), also referred to as a 4-T pixel cell, includes a photodiode (208), and four NMOS transistors (202, 204, 206, 210).

Transistor 202 has a gate that is coupled to a row reset signal, a drain that is coupled to a high power supply (VDD), and a source that is coupled to the photodiode at node 10. The photodiode has a cathode that is coupled to node 10 and an anode that is coupled to a low power supply (GND). Transistor 204 has a gate that is coupled to node 11, a source that is coupled to node 12, and a drain that is coupled to the high power supply (VDD). Transistor 206 has a gate that is coupled to a row select signal, a source that is coupled to a column readout line, and a drain that is coupled to node 12. Transistor 210 has a gate that is coupled to a shutter signal, a drain that is coupled to node 11, and a source that is coupled to node 10.

Pixel cell 300 is arranged in a substantially similar manner to pixel cell 200 described with reference to FIG. 2. Like elements and nodes are labeled identically in FIGS. 2 and 3.

Transistor 204 operates as a source follower voltage that buffers the voltage from node 11. Transistor 206 is arranged to couple the output of the source follower (transistor 204) to the column readout line when activated by the row select signal. Transistor 210 is arranged to operate as an electronic shutter that is actuated in response to the shutter signal.

The electronic shutter operates in an open position when the pixel cell detects received light, and in a closed position when the pixel cell does not detect light. Thus, the electronic shutter is closed when transistor 210 is inactive, and the electronic shutter is open when transistor 210 is active. Parasitic capacitances, such as the capacitance associated with the gate of transistor 204, are arranged to operate as a sampling capacitor for pixel cell 300. Node 11 operates as a storage node of a simple sample and hold circuit that is formed by transistor 210 and the parasitic capacitances at node 11. The photodiode voltage is coupled to the storage node (node 11) when transistor 210 is active. Each source follower (i.e., transistor 204 in FIG. 3) in the pixel array (i.e. pixel array PA in FIG. 1) is arranged to store the signal level of each pixel at the end of the integration time. The column readout lines are later used to read the level of each of the pixels from the respective storage nodes.

Exemplary Threshold Detectors

Figure 4:
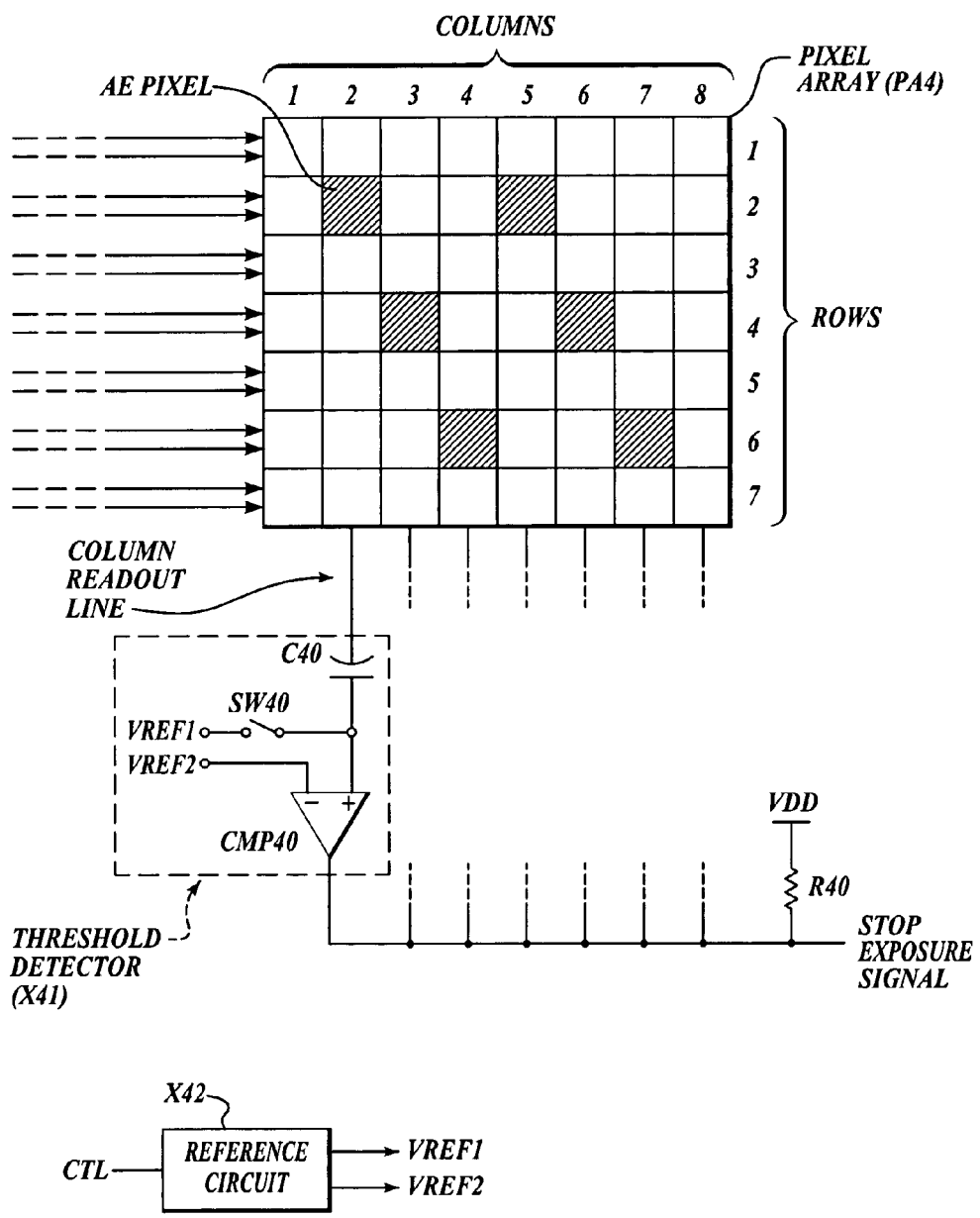
FIG. 4 is a schematic diagram of an exemplary threshold detector circuit that is arranged in an imaging system.

FIG. 4 is a schematic diagram of an exemplary threshold detector circuit (X41) that is arranged in an imaging system (400), in accordance with the present invention.

Imaging system 400 includes a pixel array (PA4) that is arranged into a set of rows (i.e., 7 rows) and columns (i.e., 8 columns). The pixel array (PA4) includes a selected group of pixels (AE pixels) that are used for automatic exposure control. As illustrated in FIG. 4, AE pixels are located in columns 2–7, at rows 2, 4, 6, 2, 4, and 6, respectively. As in FIG. 1, row reset lines and row select lines are configured to reset and select a respective one of the rows. When a row select line is selected, each pixel in the selected row is coupled to a respective one of the column readout lines. The column readout line for column 2 is coupled to a threshold detector X41 as illustrated in FIG. 4. Similarly, columns readout lines for columns 3–7 are coupled to a respective threshold detector (not shown) that is the same or similar to X41. Each of the threshold detectors includes an output that is coupled to the stop exposure signal line. A pull-up resistor (R40) is coupled between the high power supply and the stop exposure signal line. A reference circuit (X42) is arranged to provide two reference voltages (VREF1, VREF2) in response to a control signal (CTL).

Imaging system 400 is similar to imaging system 100 illustrated in FIG. 1. However, each one of peak signal detector circuits X6–X8 is replaced by a corresponding threshold detector such as threshold detector circuit X41 illustrated in FIG. 4. The functions of peak signal detector circuits X6–X8, scan circuit X9, peak signal detector circuit X10, and threshold detector circuit X11 are combined together into the series of threshold detector circuits (X41).

Threshold detector circuit X41 includes a comparator circuit (CMP40), a capacitor circuit (C40), and a switching circuit (SW40). A first reference voltage (VREF1) is coupled to a first input (i.e., the non-inverting input) of comparator circuit CMP40 when switching circuit SW40 is in a closed position, and decoupled from the first input of comparator circuit CMP40 when switching circuit SW40 is in an open position. A second reference voltage (VREF2) is coupled to a second input (i.e., the inverting input) of comparator circuit CMP40. Capacitor circuit C40 is coupled between a column readout line (i.e., the column readout line for column 2) and the first input of comparator circuit CMP40.

The output of comparator circuit CMP40 is coupled to the stop exposure signal line. The output of comparator circuit CMP40 may be configured as a wired OR, an open collector, or open drain type of output such that the stop exposure signal line is normally high until any of comparators circuit CMP40 in the threshold detectors exceeds the exposure threshold for the pixel array. Threshold detector X41 compares the signal level associated with the column readout lines to the exposure threshold. The stop exposure signal is set to a low logic level (i.e., logic 0) when any one of the threshold detector outputs indicates that the exposure threshold has been reached. The exposure threshold is arranged to ensure that the pixels in the pixel array are not overexposed.

The outputs of the hashed pixels in FIG. 4 (AE Pixels) are observed by the threshold detector circuits X41 to determine the appropriate exposure time. The operation of the threshold detector is described with reference to a reset time interval, an exposure time interval, and a readout time interval. During the reset time interval the pixel array is reset such that the pixels are initialized to an initialization voltage. During the exposure time interval the pixel array is exposed to reflected light that corresponds to the light reflected from the scene. During the readout time interval, the pixels from the pixel array are read out of the column readout lines such that the image data output is provided as described above with reference to FIG. 1.

Threshold detector circuits (X41) are arranged to monitor the column readout lines during the reset time interval. For example, the column readout line for column 2 is selected such that the column readout line provides a readout voltage (i.e., Vd–Vt) to the bottom plate of capacitance circuit C40. Since the photodiodes in the pixel array are not exposed to light during the reset time interval, the readout voltage corresponds to Vi–Vt. Switch SW40 is closed during the reset time interval such that the top plate of capacitance circuit C40 receives reference voltage VREF1. Switching circuit SW40 is opened at the end of the reset time interval such that the voltage that is stored in capacitance circuit C40 corresponds to (VREF1–Vi–Vt), relative to the top plate of capacitance circuit C40.

The exposure time interval is started after all of the pixels in the pixel array, and all of the AE pixel's reset levels that are stored in the corresponding threshold detectors, are reset. The pixel array is exposed to reflected light during the exposure time interval. The reflected light corresponds to light that is reflected from the objects in the scene. The pixel array may be exposed by opening a shutter means such as a mechanical shutter or an electronic shutter, or by activating a light source. The photocurrents in the pixels are integrated during the exposure time interval as previously described. The readout voltage of each pixel is observed by activating the corresponding row select lines. Each column readout line will have a readout voltage that corresponds to Vi–Vs–Vt, as previously described. Since the readout voltage is coupled to the bottom plate of the capacitance circuit (C40), the top plate of the capacitance circuit will have an associated voltage that corresponds to VREF1–Vs, where Vs is the signal voltage that is related to the integrated photocurrent as previously described.

The potential of the top plate of capacitor C40 is compared to the second reference voltage (VREF2) by comparator circuit CMP40. The output of comparator circuit CMP40 will change from a high logic level (logic 1) to a low logic level (logic 0) when the signal voltage (Vs) exceeds the difference between the first and second reference voltages. The exposure threshold for the threshold detector is determined by the difference between the first and second reference voltages.

The source follower in each pixel cell of the pixel array has a threshold voltage (Vt) that may be different from the threshold voltages of the other source followers. The differences between the threshold voltages of the source followers are a potential source of inaccuracies in detecting when a pixel cell has reached saturation. The threshold voltage (Vt) that is associated with the source followers is effectively eliminated by the above-described capacitance storage method, such that the signals provided to the non-inverting inputs of the comparators correspond to VREF1–Vs. The accuracy of the signals provided to the comparators is improved by eliminating the threshold voltages, resulting in improved exposure time accuracy.

In one embodiment, the exposure time interval is concluded when the exposure threshold is exceeded by any one of the comparator outputs. In another embodiment, the digital timing control circuit includes a timeout feature such that infinite exposure times are avoided. The exposure threshold may be statically set by the first and second reference voltages, or dynamically set by changing the second reference voltage during the integration time interval. The control signal (CTL) of the reference circuit may be used to control the first and second reference voltages to provide either the static or dynamic exposure threshold.

The exposure threshold may be set to a level corresponding to 100% saturation, or another level such as 80% or 90% of the saturation limit for the pixels. System latencies can be accounted for by setting the exposure threshold at a level below 100% saturation. Pixel cells in the pixel array can only be accessed a single row at a time in a CMOS array. The pixel cells continue to integrate incident light even though the particular pixel cells may not be currently selected as the active row. It is therefore possible that a particular pixel cell may exceed (i.e., overshoot) its saturation limit between subsequent scans of the row corresponding to the particular pixel cell. Overexposure of the particular pixel cell may result when the saturation limit for a pixel in the pixel array is exceeded such that poor image contrast is realized. Additionally, the brightest pixel in the pixel array may fail to be observed since the system observes a sub-sampling of the pixels in the pixel array. An overexposure margin is realized by stopping the exposure when the exposure threshold of the observed pixels reaches a level below 100% of their saturation limit (e.g., 80% of saturation). The dynamic range of the system is not detrimentally affected by reducing the exposure threshold of the system. For example, an exposure threshold corresponding to 80% of the saturation limit results in a loss of dynamic range of only 2 dB.

An analog front-end (AFE) circuit may be employed to adjust the image data output (see FIG. 1) for use with an analog-to digital converter (ADC) circuit. The exposure threshold of the system may need to be lowered to accommodate any increased signal gain from the AFE circuit. For example, the ADC circuit may have a maximum voltage of 2 Volts, and the pixels reach saturation when the corresponding image data output is 2 Volts. However, pixel response may be small in low light situations such that the exposure time is excessively long to reach saturation in the pixels. The AFE circuit may be arranged to increase the signal level of the image data output such that the signals provided to the ADC circuit reach a maximum level (e.g., 2V) even though the pixel cells have not reached saturation. The exposure threshold may be set to a level that is below 100% saturation by an amount that is inversely proportional to the gain of the AFE circuit. For example, the exposure threshold level may be set to half of the saturation level when the AFE circuit has a gain of two. Also, the exposure level may be set to a predetermined percentage of the desired exposure threshold level (e.g., 80%–90% of half of the saturation level) to allow for system latencies as previously described-above.

The readout time interval is started after the exposure time interval is concluded. The signals from the entire pixel array are processed during the readout time interval such that the image data output includes image signals corresponding to each pixel in the pixel array. Since the exposure of the pixel array is automatically adjusted to a saturation limit, the image data output corresponds to an image with improved contrast.

Figure 5:
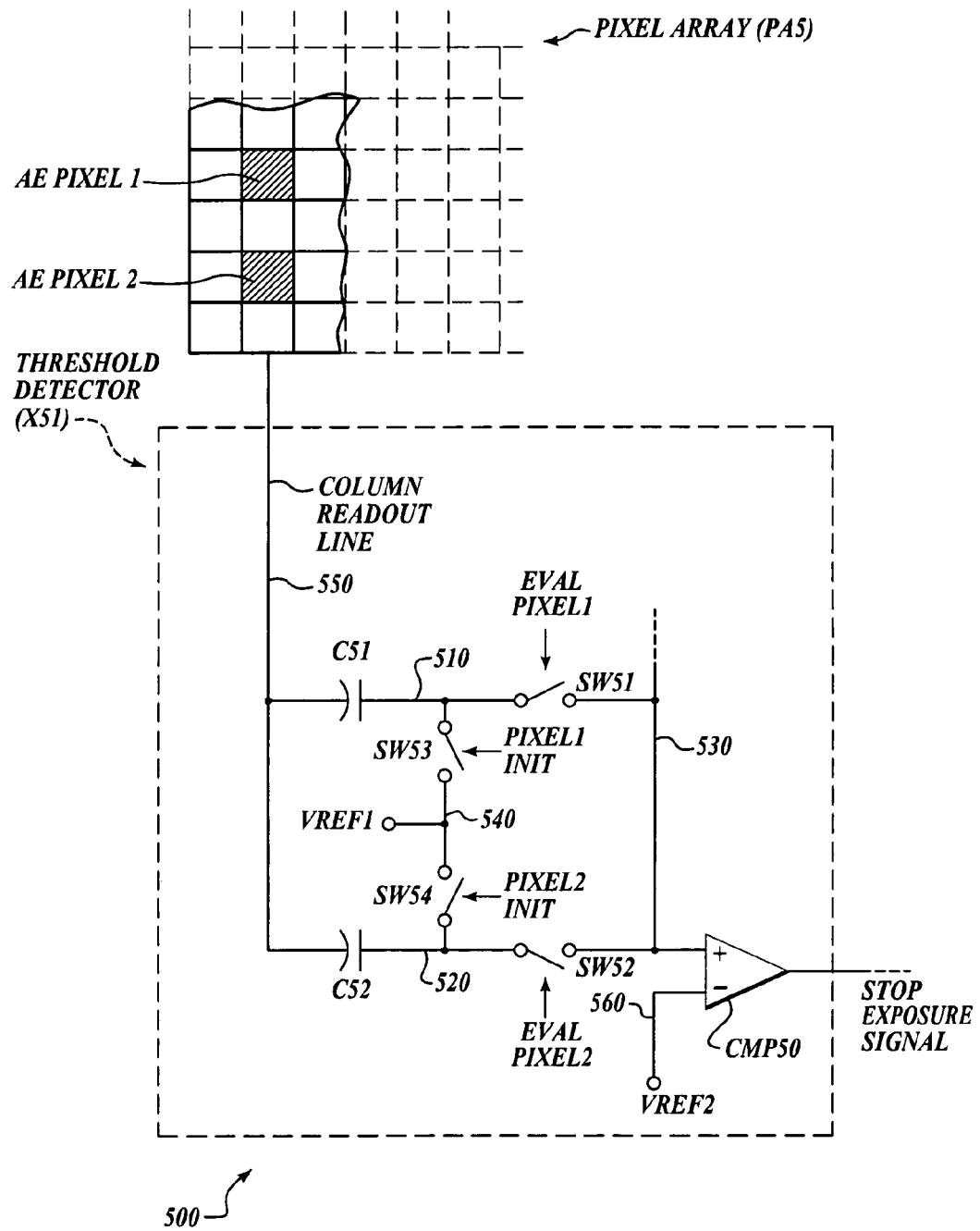
FIG. 5 is a schematic diagram of another exemplary threshold detector circuit that is arranged in an imaging system.

As illustrated in FIG. 4, each of the sub-sampled pixels (AE Pixels) is in a unique column with a corresponding threshold detector circuit (X41). However, it may be impracticable to utilize a separate threshold detector circuit (X41) for each column when a large pixel array is used. For example, a 512-column pixel array may have a sub-sample set of pixels that results in up to 100 threshold detector circuits. FIG. 5 illustrates a second example threshold detector that is arranged to reduce the component count necessary to implement the threshold detectors.

FIG. 5 is a schematic diagram of another exemplary threshold detector circuit (X51) that is arranged in an imaging system (500), in accordance with the present invention. Imaging system 500 includes a pixel array (PA5) that includes at least two pixels (i.e., AE pixels 1 and 2) that are located in the same column of the pixel array.

Threshold detector circuit X51 includes at least two capacitor circuits (C51–C52), at least four switching circuits (SW51–SW54), and a comparator circuit (CMP50). Each capacitance circuit (i.e., capacitance circuits C51 and C52) is associated with a corresponding pixel (i.e., AE pixels 1 and 2) and a particular column readout line. Capacitance circuit C51 has a bottom plate that is coupled to node 550, and a top plate that is coupled to node 510. Capacitance circuit C52 has a bottom plate that is coupled to node 550, and a top plate that is coupled to node 520. Switching circuit SW51 is coupled between nodes 510 and 530, and actuated in response to an EVAL PIXEL1 signal. Switching circuit SW52 is coupled between nodes 520 and 530, and actuated in response to an EVAL PIXEL2 signal. Switching circuit SW53 is coupled between nodes 510 and 540, and actuated in response to a PIXEL1 INIT signal. Switching circuit SW54 is coupled between nodes 520 and 540, and actuated in response to a PIXEL2 INIT signal. Comparator circuit CMP50 has a first input (i.e., a non-inverting input) that is coupled to node 530, a second input (i.e., an inverting input) that is coupled to node 560, and an output that is arranged to provide the stop exposure signal.

In operation, a first reference voltage (VREF1) is coupled to node 540, and a second reference voltage (VREF2) is coupled to node 560. Capacitance circuit C51, and switching circuit SW53 operate in a substantially similar manner as threshold circuit X41 in FIG. 4. Capacitance circuit C51 operates as a storage device that is arranged to sample the difference between a signal voltage that is associated with a first pixel (i.e., AE pixel 1) and the first reference voltage (VREF1). Similarly, capacitance circuit C52 and switching circuit SW54 are arranged to operate in a storage device that is arranged to sample the difference between a signal voltage that is associated with a second pixel (i.e., AE pixel 2) and the first reference voltage (VREF2). The EVAL PIXEL1 and EVAL PIXEL2 signals are responsive to the row select signals (see FIG. 1) corresponding to AE pixel 1 and AE pixel 2, respectively. Similarly, the PIXEL1 INIT and PIXEL2 INIT signals are responsive to the row reset signals (see FIG. 1) corresponding to AE pixel 1 and AE pixel 2, respectively.

Node 530 operates as a common-node that is selectively coupled to nodes 510 and 520. Switching circuits SW51 and SW52 are arranged such that a single comparator (CMP50) is multiplexed between evaluating the voltages associated with the top plates of capacitance circuits C51 and C52. The voltages associated with the capacitance circuits can only be evaluated when one of the EVAL PIXEL signals is asserted. In other words, at least one of the capacitance circuits must be coupled to the common node when the output of comparator circuit CMP50 is evaluated. Another circuit such as a latch, or some other circuit such as the digital timing control circuit is arranged to evaluate (or sample) the stop exposure signal such that the output of comparator CMP50 is only evaluated at appropriate times during the exposure time interval.

Additional capacitance and switching circuits may be added such that additional pixels may be evaluated. In one example, additional capacitance circuits are (e.g., C53, C54, . . . ) and additional switching circuits are provided such that additional AE pixels from the same column of the pixel array may be evaluated by the common comparator circuit. In another example, another column readout line is coupled to additional capacitance circuits, and additional switching circuits are provided such that the comparator circuit may evaluate additional AE pixels from a different column of the pixel array.

First Exemplary Procedural Flow

Figure 6:
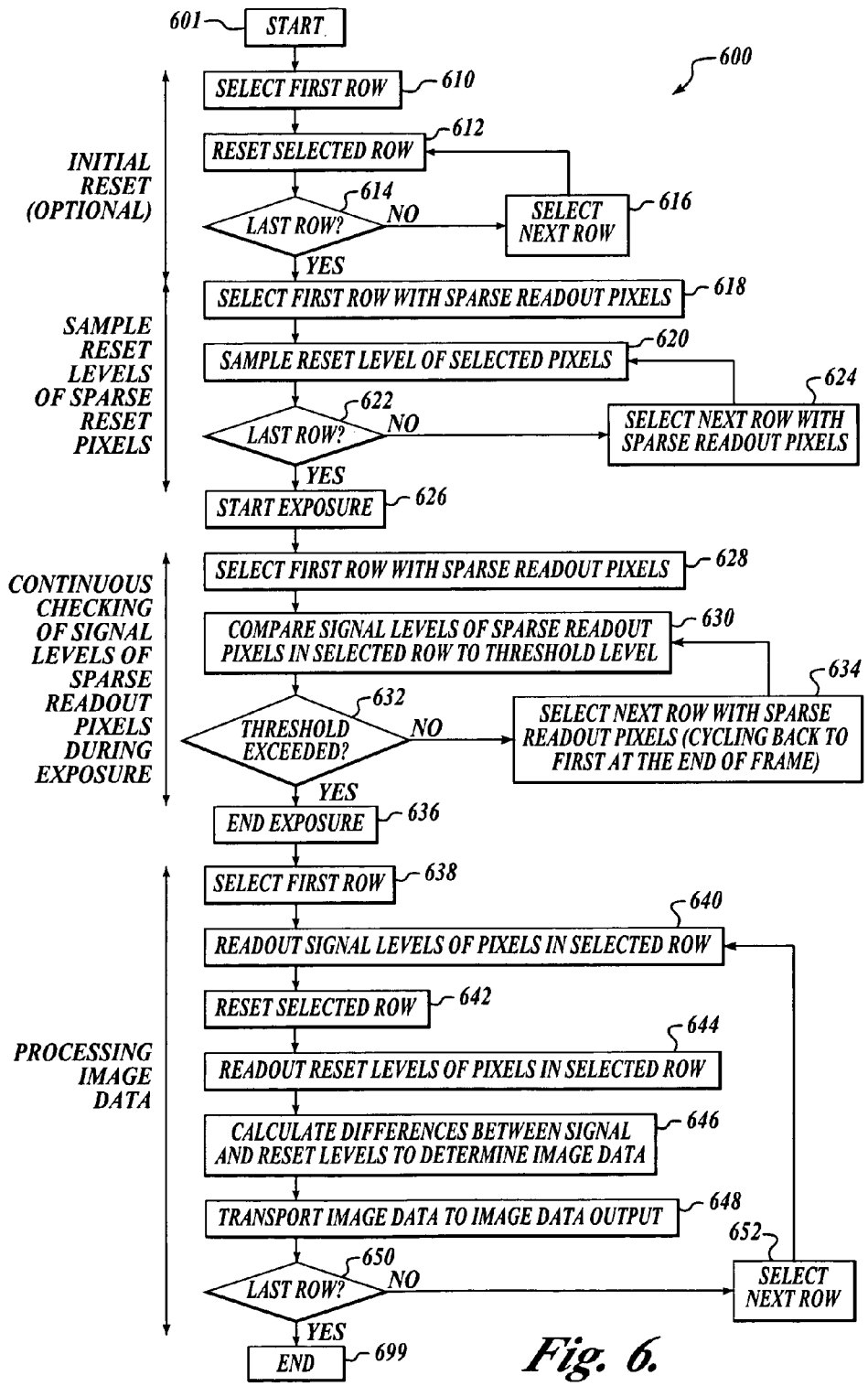
FIG. 6 is a procedural flow diagram of an exemplary imaging system.

FIG. 6 is a procedural flow diagram of the exemplary threshold detector such as that illustrated in FIG. 4.

Processing flows from block 601 (START) to block 610. At block 610, the first row of the pixel array is selected. Processing continues to block 612 where the selected row is reset. Continuing to decision block 614, the system evaluates the currently selected row to determine if the currently selected row is the last row in the pixel array. Processing flows from decision block 614 to block 616 when the additional rows in the pixel array need to be processed. At block 616 the next row in the pixel array is selected. Processing flows from block 616 to block 612. Processing continues from decision block 614 to block 618 after the last row in the pixel array has been processed.

At block 618, the system selects the first row that has a sparse readout pixel (or pixels). The sparse readout pixels correspond to the AE pixels such as that illustrated in FIGS. 1, 4, and 5. Continuing to block 620, the reset level for each sparse readout pixel is sampled. Processing flows to decision block 622, where the selected row is evaluated to determine if the selected row corresponds to the last row in the pixel array that includes sparse readout pixels (AE Pixels). Processing flows from decision block 622 to block 624 when additional rows need to be processed. At block 624, the next row in the pixel array that includes sparse readout pixels is selected. Processing flows from block 624 to block 620. Processing continues from decision block 622 to block 626 after the last row of sparse pixels has been processed.

At block 626, the exposure interval of the pixel array is started. Continuing to block 628, the system selects the first row that has a sparse readout pixel (or pixels). Continuing to block 630, the signal level for each selected sparse readout pixel is compared to a threshold level. Processing flows to decision block 632, where the selected row is evaluated to determine if any of the signals associated with the sparse readout pixels exceeds the threshold level. Processing flows from decision block 632 to block 634 when the threshold level is not exceeded. At block 634, the next row in the pixel array that includes sparse readout pixels is selected, cycling back to the first row when the end of the frame is reached. Processing flows from block 634 to block 630. Processing continues from decision block 632 to block 636 when the threshold level has been exceeded by at least one of the sparse readout pixels. At block 636, the exposure interval ends and the exposure of the pixel array is terminated.

Continuing to block 638, the first row of the pixel array is selected. Processing flows to block 640 where the signal levels of the pixels in the selected row are retrieved (or read-out). Proceeding to block 642, the selected row is reset. Continuing to block 644 the reset levels of the pixels in the selected row are retrieved. Flowing to block 646, image data for each pixel in the selected row is determined by calculating the difference between the reset level and the signal level for each pixel. Continuing to block 648, the image data from the selected row is transported to the image data output (see FIG. 1). Continuing to decision block 650, the currently selected row is evaluated to determine if the currently selected row is the last row in the pixel array. Processing flows from decision block 650 to block 652 when the additional rows in the pixel array need to be processed. At block 652 the next row in the pixel array is selected. Processing flows from block 652 to block 640. Processing continues from decision block 659 to block 699, where processing is terminated after the last row in the pixel array has been processed.

Blocks 610–616 comprise an initialization (or reset) process that is arranged to initialize the pixel array to a known reset condition. The initialization routine is an optional routine since the pixels in the pixel array are reset during the readout process at block 642.

Blocks 618–624 comprise a sampling process that is arranged to sample the reset levels of the sparse readout pixels. Although the above-described procedural flow includes a separate processing loop for the initialization process and the sampling process, the two processing loops may be combined into a single processing loop. For example, between block 612 and decision block 614 additional processing may be performed to determine if the currently selected row corresponds to a row that includes sparse readout pixels, and sampling the reset level for the sparse readout pixels. The sampling may be accomplished with a sampling circuit such as the threshold detectors described above.

Blocks 626–636 comprise an exposure process that is arranged to continuously check the signal levels of the sparse readout pixels during the exposure interval. Exposure may be started by an exposure means such as, for example, at least one of opening a mechanical shutter, activating an electronic shutter, and activating a light source (e.g., an LED). Each pixel in the array receives light that is reflected from the scene, while the exposure means is actuated. The comparison step (block 630, 632) may be accomplished by any means for comparing such as comparators CMP40 and CMP50 illustrated in FIGS. 4–5, where the reset level of each selected pixel is accounted for in the comparison. Exposure may be stopped by at least one of closing a mechanical shutter, deactivating an electronic shutter, and deactivating a light source (e.g., an LED).

Blocks 638–652 comprise a frame readout process that is arranged to process and transfer an entire frame from the pixel array after the exposure interval is complete. The frame readout process may include coupling the column readout signals from the pixel array to a correlated double sampling circuit as previously described above. The image data signals may be further processed by additional circuitry (not shown) including, but not limited to an analog front-end circuit (AFE), a gain scaling circuit, an offset adjustment circuit, and an analog-to-digital converter (ADC). Processing block 610–652 may be restarted as required to capture additional images.

Second Exemplary Procedural Flow

Figure 7:
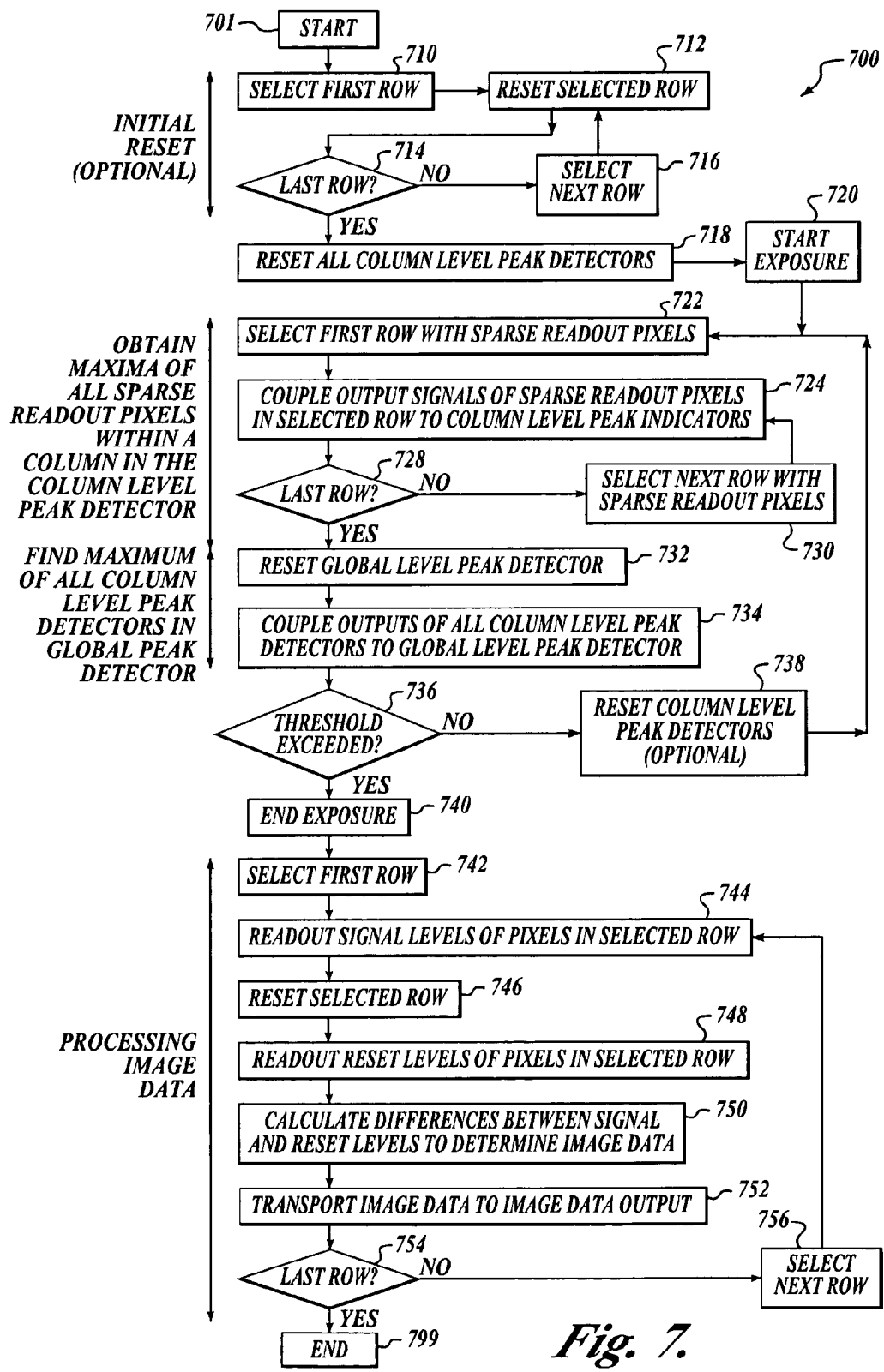
FIG. 7 is a procedural flow diagram of another exemplary imaging system.

FIG. 7 is a procedural flow diagram of an imaging system as illustrated in FIG. 1, in accordance with the present invention.

Beginning at block 710, the first row of the pixel array is selected. Processing continues to block 712 where the selected row is reset. Continuing to decision block 714, the system evaluates the currently selected row to determine if the currently selected row is the last row in the pixel array. Processing flows from decision block 714 to block 716 when the additional rows in the pixel array need to be processed. At block 716 the next row in the pixel array is selected. Processing flows from block 716 to block 712. Processing continues from decision block 714 to block 718 after the last row in the pixel array has been processed.

At block 718, the column level peak signal detectors are reset. Continuing to block 720, the exposure interval of the pixel array is started. The first row that has a sparse readout pixel (or pixels) is selected at block 722. Continuing to block 724, the signal level for each selected sparse readout pixel (i.e., AE pixel) is coupled to a respective one of the peak signal detectors (i.e., peak signal detectors X6–X8), where each peak signal detector is arranged to detect the signal associated with a column readout line. Processing flows to decision block 728, where the system evaluates the currently selected row to determine if the currently selected row is the last row in the pixel array that includes sparse readout pixels. Processing flows from decision block 728 to block 730 when the additional rows in the pixel array with sparse readout pixels need to be processed. At block 730 the next row in the pixel array that has sparse readout pixels (i.e., AE pixels) is selected. Processing flows from block 730 to block 724. Processing continues from decision block 728 to block 732 after the last row of sparse pixels has been processed.

The global level peak signal detector (i.e., peak signal detector X10) is reset at block 732. Continuing to block 734, the outputs of the column level peak signal detectors (i.e., peak signal detectors X6–X8) are coupled to the global level peak signal detector (i.e., peak signal detector X10). The global level peak signal detector provides an output that is evaluated to determine if a threshold level has been exceeded, at decision block 736. Processing continues from decision block 736 to block 738 when the threshold level has not been exceeded by the output of the global level peak signal detector. Otherwise, processing flows from decision block 736 to block 740. At block 738, the column level peak signal detectors are reset, and processing continues to block 722. The exposure interval of the pixel array is terminated at block 740, and processing continues to block 742.

At block 742, the first row of the pixel array is selected. Processing flows to block 744 where the signal levels of the pixels in the selected row are retrieved (or read-out). Proceeding to block 746, the selected row is reset. Continuing to block 748 the reset levels of the pixels in the selected row are retrieved. Flowing to block 750, image data for each pixel in the selected row is determined by calculating the difference between the reset level and the signal level for each pixel. Continuing to block 752, the image data from the selected row is transported to the image data output (see FIG. 1). Continuing to decision block 754, the currently selected row is evaluated to determine if the currently selected row is the last row in the pixel array. Processing flows from decision block 754 to block 756 when the additional rows in the pixel array need to be processed. At block 756, the next row in the pixel array is selected. Processing flows from block 756 to block 744. Processing continues from decision block 754 to block 799, where processing is terminated after the last row in the pixel array has been processed.

Blocks 710–716 comprise an initialization (or reset) process that is arranged to initialize the pixel array to a known reset condition. The initialization routine is an optional routine since the pixels in the pixel array are reset during the readout process at block 746.

Blocks 720–740 comprise an exposure process that is arranged to continuously check the signal levels of the sparse readout pixels, via peak signal detectors, during the exposure interval. Blocks 722–730 comprise a column peak detection process that is arranged to find the maximum peak level of the sparse readout pixels in each corresponding column. Blocks 732–734 comprise a maximum peak detection process that is arranged to find the maximum peak level of the column level peak signal detectors. Exposure may be started by an exposure means such as, for example, at least one of opening a mechanical shutter, activating an electronic shutter, and activating a light source (e.g., an LED). Each pixel in the array receives light that is reflected from the scene, while the exposure means is actuated. Exposure may be terminated by at least one of closing a mechanical shutter, deactivating an electronic shutter, and deactivating a light source (e.g., an LED). Block 738 is an optional block, since the signals in the peak signal detectors are reset at block 718, and the peak levels can only increase with time such that the maximum detected level in each successive scan can is larger than the maximum detected level in a previous scan. Similarly, block 732 may be eliminated when the global level peak signal detector is reset prior to exposure (i.e., in block 718).

Blocks 740–756 comprise a frame readout process that is arranged in a substantially similar manner as that described in FIG. 6. See the discussion with respect to blocks 638–652 for further details.

In one embodiment of the present invention, the sparse readout pixels discussed above correspond to a predetermined group of pixels from the pixel array. For example, the pixel array may be organized such that at every tenth column and at every tenth row a sparse readout pixel (or automatic exposure pixel) is located.

In another example, the sparse readout pixels correspond to a group of pixels that are randomly or pseudo-randomly selected at predetermined time intervals. For example, the group of sparse readout pixels from the pixel array may be randomly chosen in-between processing cycles (e.g., after each successive frame is processed). It is possible that a bright spot exists in the image at a location that is not observed by a sparse readout pixel. By randomly choosing the sparse readout pixels in each successive frame it is more likely that a bright spot in the image will be detected and overexposure will be avoided. The randomization of the sparse readout pixels may be handled periodically before or after each successive frame, or alternatively before/after a number of frames is processed as may be desired.

Operation of Exemplary Threshold Detectors

Figure 8:
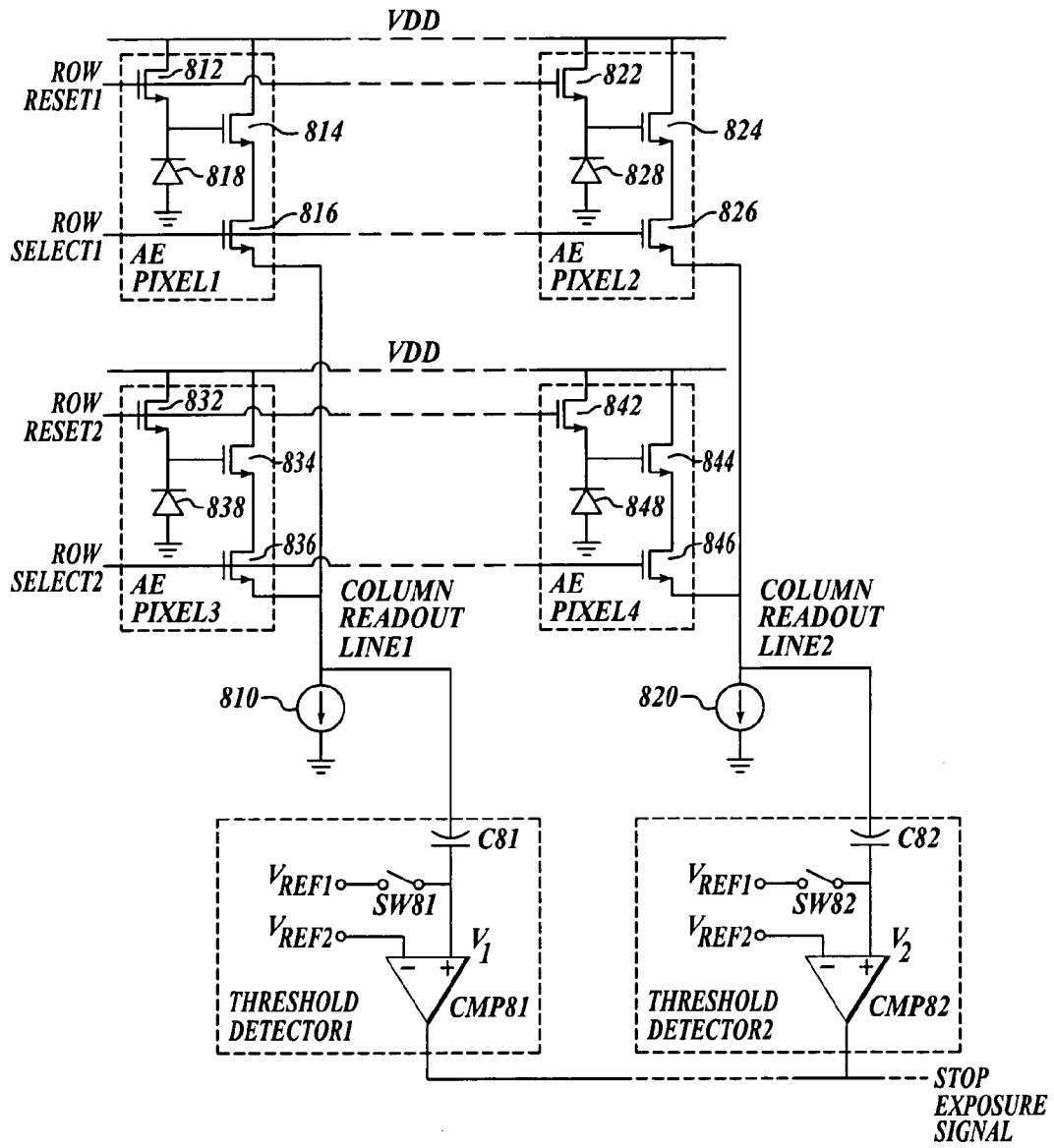
FIG. 8 is a schematic diagram of two exemplary threshold detector circuits that are arranged in an imaging system.

FIG. 8 is a schematic diagram of two exemplary threshold detector circuits that are arranged in an imaging system in accordance with the present invention. The imaging system includes two threshold detectors (Threshold Detector1, Threshold Detector2), two current sources (810, 820), and a pixel array (not shown) that includes four pixel cells (AE Pixel1, AE Pixel2).

AE Pixel 1 includes transistors 812, 814, 816, and photodiode 818. AE Pixel 2 includes transistors 822, 824, 826, and photodiode 828. AE Pixel 3 includes transistors 832, 834, 836, and photodiode 838. AE Pixel 4 includes transistors 842, 844, 846, and photodiode 848. AE Pixels 1–4 are arranged in a substantially similar manner as that described with respect to FIG. 2. Threshold Detector1 includes a capacitance circuit C81, switching circuit SW81, and comparator CMP81, which are arranged in a substantially similar manner as that described with respect to threshold detector X41 from FIG. 4. Similarly, Threshold Detector2 includes a capacitance circuit C82, switching circuit SW82, and comparator CMP82, which are also arranged in a substantially similar manner as that described with respect to threshold detector X41 from FIG. 4. AE Pixels 1 and 2 are responsive to Row Reset1 and Row Select1, while AE Pixels 3 and 4 are responsive to Row Reset2 and Row Select2. AE Pixels 1 and 3 are arranged to provide readout signals on column readout line 1 when selected, while AE Pixels 3 and 4 are arranged to provide readout signals on column readout line 2. Current sources 810 and 820 are coupled to column readout line1 and column readout line2, respectively.

Threshold Detector1 and Threshold Detector2 each include an input that is coupled to column readout line1 and column readout line2, respectively, and an output that is coupled to a stop exposure signal line. By sharing a common output (the stop exposure line), the threshold detectors are arranged to operate in parallel. The stop exposure line depicted in FIG. 8 is an active low signal such that the exposure of the pixel array is stopped when the stop exposure line corresponds to a low logic signal.

Figure 9:
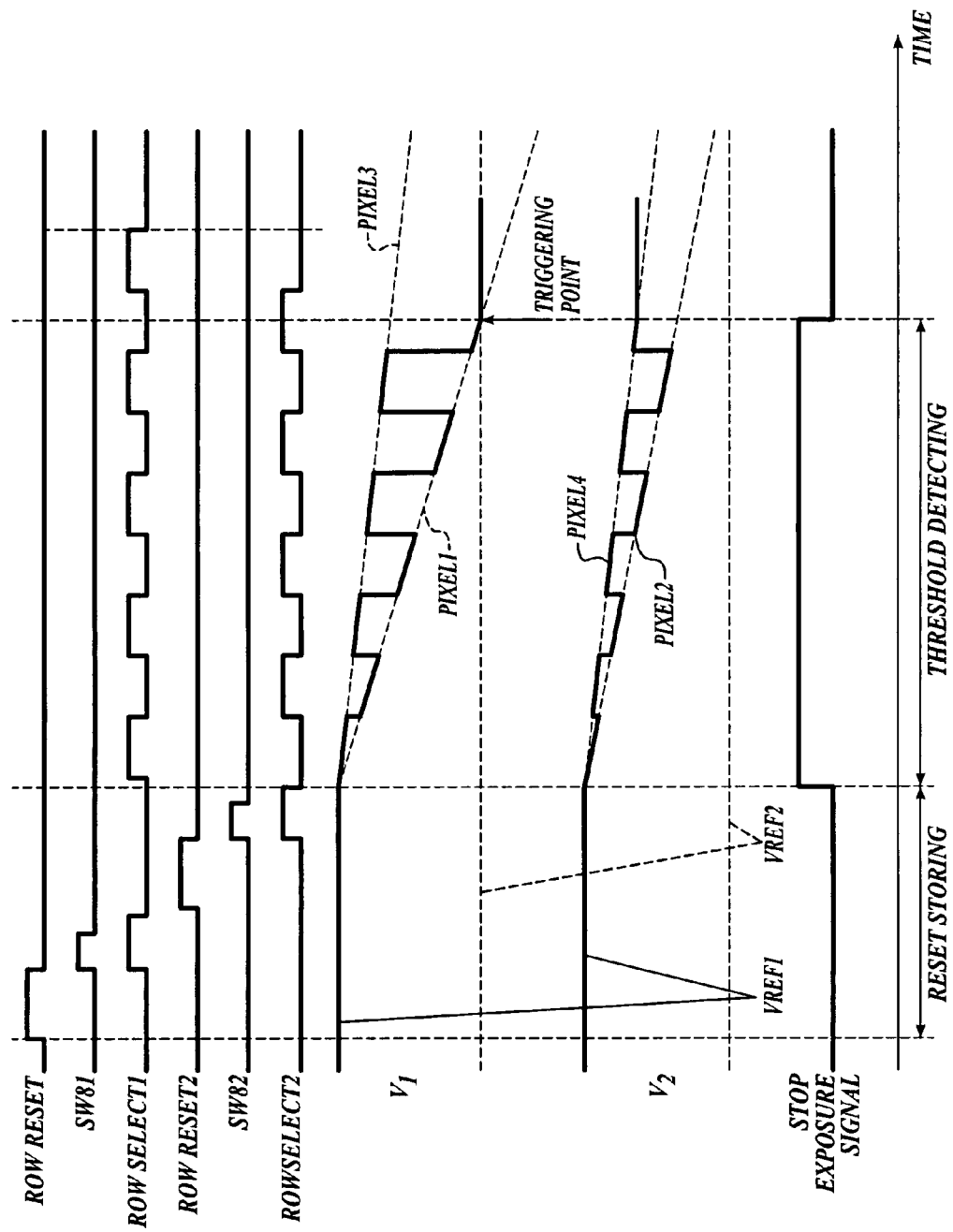
FIG. 9 is a timing diagram for the two exemplary threshold detector circuits from FIG. 8.

FIG. 9 is a timing diagram for the two exemplary threshold detector circuits from FIG. 8. The threshold detector circuits include at least a two operating modes: a reset-storing mode, and a threshold-detecting mode. For the discussion that follows below, AE Pixel1 is exposed by a brighter light signal than that of AE Pixel2–AE Pixel4.

Reset-Storing Mode

During the reset-storing mode, the stop exposure signal is set to low such that the pixel array is not exposed. The reset time interval for the reset-storing mode begins when the first row is reset, and ends after the last row is selected.

Row Reset1 pulses high during a first portion of the reset time interval such that photodiodes 818 and 828 in AE Pixel1 and AE Pixel 2 are reset and a charge is stored on the charge storage nodes (the gate of transistors 814, 824) as previously described. Switch SW81 is actuated such that the top plate of capacitance circuit C81 is initialized to VREF1 during a second portion of the reset time interval. AE Pixel3 and AE Pixel4 are reset when Row Reset2 is asserted during a third portion of the reset time interval. Switch SW82 is actuated such that the top plate of capacitance circuit C81 is initialized to VREF1 during a fourth portion of the reset time interval. Thus, V1 and V2 correspond to VREF1 at the end of the reset time interval.

Row Select1 is pulsed high after the photodiodes are initialized to their respective reset levels, such that readout signals from AE Pixel1 and AE Pixel3 are coupled through column readout line1 to the bottom plate of capacitance circuit C81. Similarly, Row Select2 is pulsed high and readout signals from AE Pixel 2 and AE Pixel4 are coupled though column readout line2 to the bottom plate of capacitance circuit C82 during the second and fourth portions of the reset time interval, respectively. At the end of the reset time interval, capacitance circuits C81 and C82 store the corresponding reset levels of the pixels as referenced to VREF1.

Threshold-Detecting Mode

During the threshold-detecting mode, the stop exposure signal is set to high such that the pixel array is exposed, and a signal corresponding to the light intensity is provided by the photodiodes. The exposure time interval for the threshold-detecting mode begins after the conclusion of the reset-time interval, and ends when a trigger point is found or when the exposure time interval exceeds a predetermined time limit.

The row select signals (row select1 and row select2) are periodically activated such that the comparators evaluate the readout signals from each corresponding pixel. A first readout signal from AE Pixel1 is coupled through column readout line1 to capacitance circuit C81 while row select1 is active. A second readout signal from AE Pixel2 is coupled through column readout line2 to capacitance circuit C88 while row select1 is active. A third readout signal from AE Pixel3 is coupled through column readout line1 to capacitance circuit C81 while row select2 is active. A fourth readout signal from AE Pixel4 is coupled through column readout line2 to capacitance circuit C82 while row select2 is active. Voltage V1 changes in response to changes in the signal from column readout line1. Comparator CMP81 monitors the signal that is provided by photodiodes 818 and 838 by monitoring voltage V1. Similarly, voltage V2 changes in response to changes in the signal from column readout line2. Comparator CMP82 monitors the signal that is provided by photodiodes 828 and 848 by monitoring voltage V2.

At the end of the threshold-detecting mode, voltage V1 approaches VREF2, and voltage V2 is higher than VREF2. Since at least one of the comparators (CMP81) provides a low signal, the stop exposure signal is forced to a low logic level. Comparator CMP81 triggers the assertion of the stop exposure signal when voltage V1 drops below VREF2 at the triggering point. The stop exposure signal is used to deactivate the exposure of the pixel array as previously described.

Second Exemplary Imaging System

Figure 10:
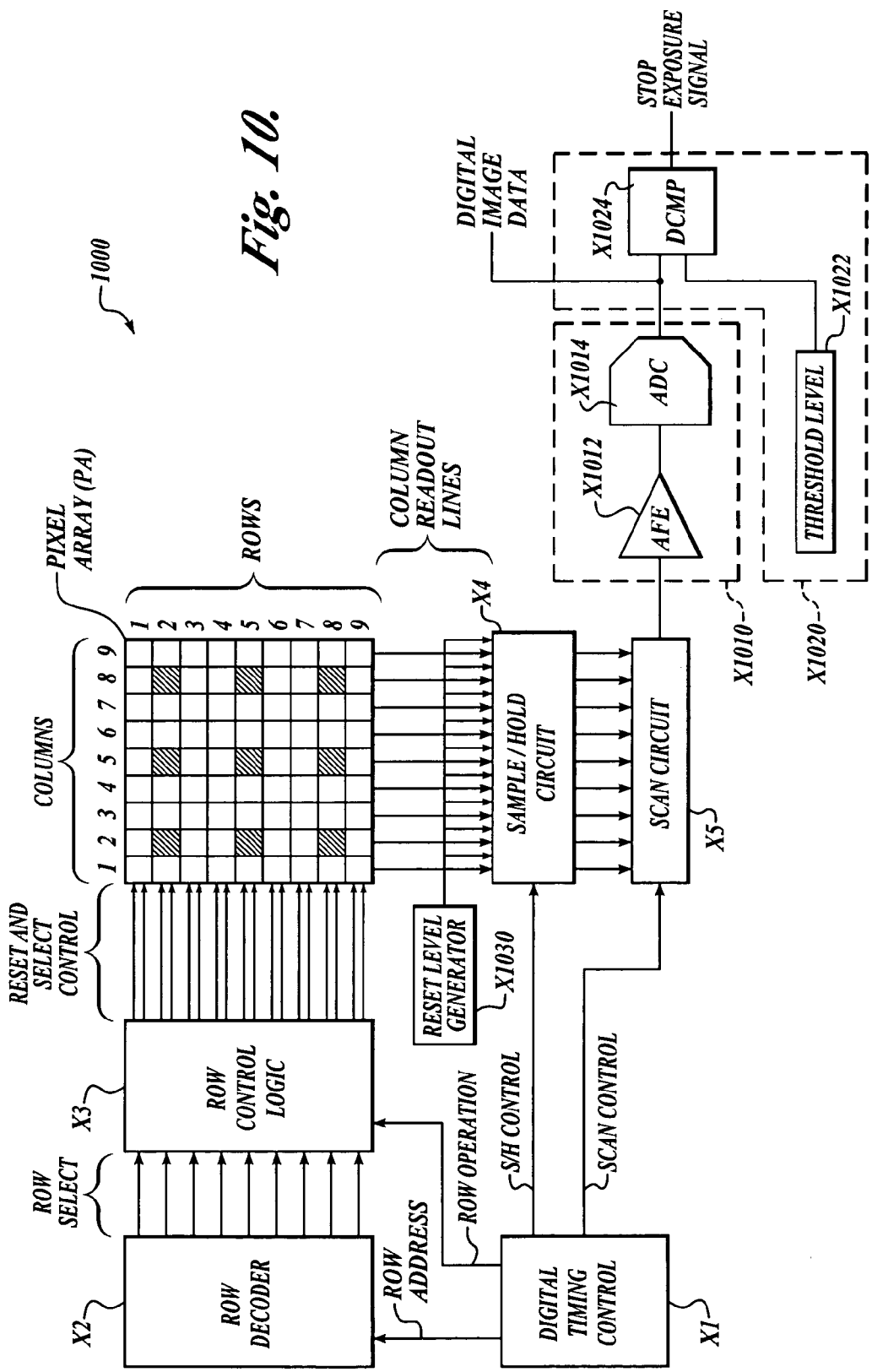
FIG. 10 is a schematic diagram of a second exemplary imaging system.

FIG. 10 shows another exemplary imaging system (1000) that includes automatic exposure control that is arranged in accordance with the present invention. Imaging system 1000 is similar to imaging system 100 from FIG. 1. Like components from FIG. 1 are labeled identically in FIG. 10, and operate in a similar manner to that already discussed above.

The pixels in pixel array PA in FIG. 10 are activated as previously described with respect to FIG. 1. Imaging system 1000 differs from imagining system 100 in that the functions of peak signal detectors X6–X8, scan circuit X9, peak signal detector X10, and threshold detector X11 are digitally processed as will be described below.

Imaging system 1000 includes pixel-processing circuitry that that is divided into an analog processing portion (X1010) and a digital processing portion (X1020). The output of scan circuit X5 is coupled to analog processing portion X1010. The analog processing portion of the pixel processing circuitry includes an optional analog front end (AFE, X1012) and an analog-to-digital converter (ADC, X1014). AFE X1012 is arranged to provide a gain and/or an offset to received signals such that the input to ADC X1014 is properly adjusted. ADC X1014 converts received analog signals into a digital image data. The digital processing portion (X1020) of the pixel processing circuitry includes a threshold level generator (X1022) and a digital comparator (DCMP, X1024). The threshold level generator (X10122) is arranged to provide a digital code that corresponds to a particular exposure limit as previously described with respect to FIGS. 1–9. DCMP X1024 compares the digital image data to the exposure limit.

The functions of the digital comparator (X1024) and the threshold level generator may be provided by any appropriate digital electronic circuitry, including but not limited to a programmable logic array (PLA), a microprocessor, a microcontroller, and the like. Additionally, the functions of ADC X1014 and the digital processing portion (X1020) of the pixel processing circuitry may be combined in a microcontroller.

As previously described, the reset level associated with a column readout of a pixel cell corresponds to (VDD−Vt) or (VDD−2*Vt). The pixel processing circuitry is arranged to continuously monitor the digital image data to determine when any sampled pixel exceeds the exposure threshold. However, the pixels in the pixel array may not be reset until the end of the exposure interval for a non-destructive readout. In this example, the sample/hold circuit X4 does not sample the reset level until the exposure time interval has expired such that the reset levels are not accounted for in evaluating each pixel in the digital image signal. Reset level generator X1030 is arranged to provide a reference voltage to sample/hold circuit X4 such that the effect of the offset in the signal is reduced. For example, a diode connected MOSFET can be arranged to provide a reference voltage corresponding to roughly (VDD−Vth), where Vth corresponds to the threshold voltage of the MOSFET. The threshold voltage (Vth) of the MOSFET is arranged to approximate the threshold voltage (Vt) from the pixel cells. Since the threshold voltage of the MOSFET may not be exactly the same as the reset level for the pixels, fixed pattern noise will result such that a small error is included in the sample/hold circuit output.

Third Exemplary Imaging System

Figure 11:
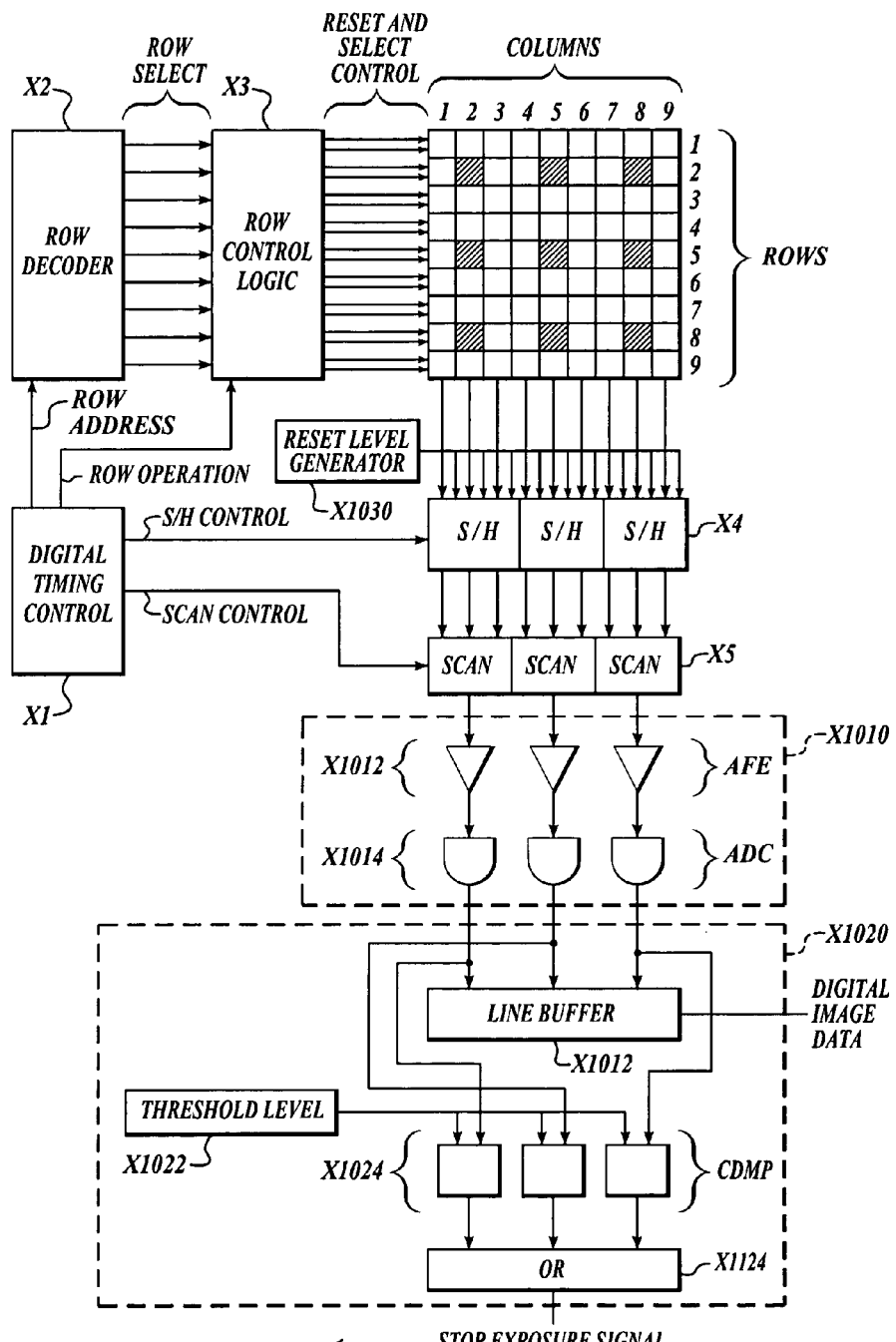
FIG. 11 is a schematic diagram of a third exemplary imaging system.

FIG. 11 shows still another exemplary imaging system (1100) that includes automatic exposure control that is arranged in accordance with the present invention. Imaging system 1100 is similar to imaging system 100 from FIG. 1, and also similar to imaging system 1000 described wit reference to FIG. 10. Like components from FIG. 1 and FIG. 10 are labeled identically in FIG. 11, and operate in a similar manner to that already discussed above.

Imaging system 1100 differs from imaging system 1000 in that pixel processing circuitry in FIG. 11 is arranged to process multiple signals in a parallel fashion. For example, FIG. 11 illustrates that scanner X5 has three output signals that are coupled to respective analog front-end circuits (X1012), which in turn provide analog signals to respective analog-to-digital converter circuits (X1014). The output from ADC circuits X1014 are provided to data signals to a line buffer (X1122). Line buffer X1122 is arranged to reorder the data signals, and provides the digital image data signal as an output. Each digital comparator circuit (X1024) is arranged to receive a respective one of the data signals from the ADCs (X1014), and the digital code that corresponds to the exposure limit. The outputs of the digital comparator circuits (X1024) are provided to a logical OR circuit (X1124) such that the stop exposure signal is asserted when any one of the digital comparator circuits asserts its respective output signal.

Fourth Exemplary Imaging System

Figure 12:
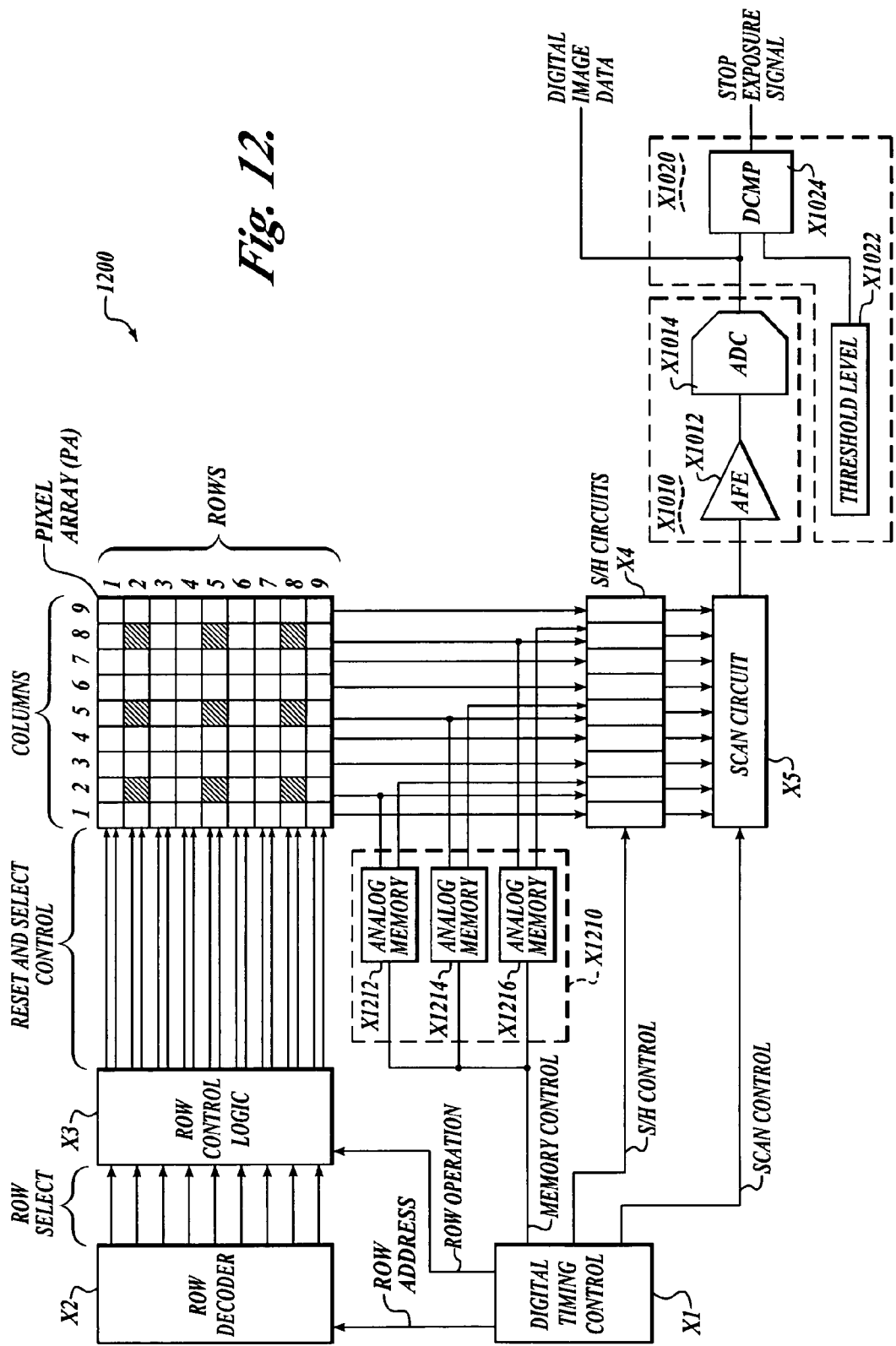
FIG. 12 is a schematic diagram of a fourth exemplary imaging system.

FIG. 12 shows yet another exemplary imaging system (1200) that includes automatic exposure control that is arranged in accordance with the present invention. Imaging system 1200 is similar to imaging system 100 from FIG. 1, and also similar to imaging system 1000 described wit reference to FIG. 10. Like components from FIG. 1 and FIG. 10 are labeled identically in FIG. 12, and operate in a similar manner to that already discussed above.

Imaging system 1200 differs from imaging system 1000 in that a reset memory circuit (X1210) is included in FIG. 12. The reset memory circuit (X1210) includes multiple analog memory circuits (e.g., X1212, X1214, X1216). The analog memory circuits (e.g., X1212, X1214, X1216) are arranged to sample the reset levels associated with the AE pixels corresponding to their respective column readout lines (e.g., columns 2, 5, 8). For example, the first analog memory circuit (X1212) is arranged to sample the reset levels for the AE pixels associated with column readout line 2, rows 2, 5, and 8.

As discussed above with respect to FIG. 10, fixed pattern noise may result when a mismatch exists between the true reset level of the pixels in the pixel array, and the reference voltage that is provided by the reset level generator (X1030). The automatically adjusted exposure time of the pixel array may be improper due to the fixed pattern noise such that the exposure time gives poor image quality. To prevent these problems, the reset memory circuit (X1210) is provided between the pixel array and the sample/hold circuits. The analog memory has a similar function as the capacitor circuits illustrated previously with respect to FIG. 4.

During the initial reset of the pixel array (the reset time interval), the analog memory circuits sample the reset levels of the AE pixels. The first analog memory circuit (X1212) samples the reset levels of the pixels associated with column 2, at rows 2, 5, and 8. The second analog memory circuit (X1214) samples the reset levels of the AE pixels associated with column 5. The third analog memory circuit (X1216) stores the reset levels of the AE pixels associated with column 8. During the exposure time interval, the sample/hold circuits sample the signal levels from the pixels and the reset levels from the analog memory circuits, such that the read out of the pixel array is non-destructive and has improved measurement accuracy. FIG. 12 is the same as FIG. 10 with the addition of Vt-mismatch cancellation, similar to that described-above with respect to FIG. 4.

Fifth Exemplary Imaging System

Figure 13:
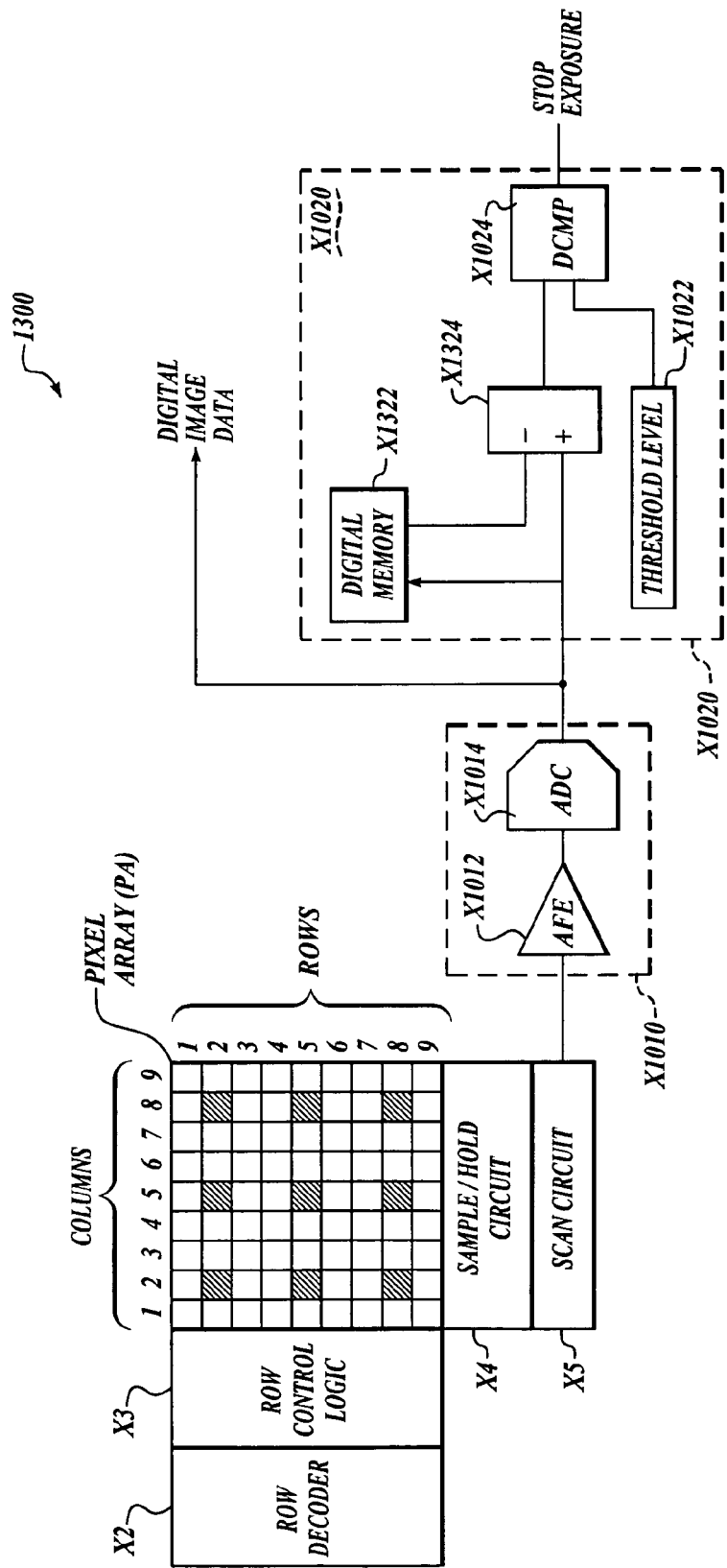
FIG. 13 is a schematic diagram of a fifth exemplary imaging system.

FIG. 13 shows still yet another exemplary imaging system (1300) that includes automatic exposure control that is arranged in accordance with the present invention. Imaging system 1300 is similar to imaging system 100 from FIG. 1, and also similar to imaging system 1000 described with reference to FIG. 10. Like components from FIG. 1 and FIG.

10 are labeled identically in FIG. 13, and operate in a similar manner to that already discussed above.

Imaging system 1300 differs from imaging system 1000 in that the pixel processing circuitry includes a digital processing portion (X1020) that includes a digital memory circuit (X1322) and a difference circuit (X1324). The digital memory circuit (X1322) is arranged to store the output codes from ADC X1014, and provide a digital code output when accessed. The difference circuit is arranged to determine a difference between the digital codes from ADC X1014 and the digital codes from digital memory circuit (X1322), and provide a digital code output in response thereto. The digital comparator circuit (X1024) is arranged to compare the digital code from the output of the difference circuit (X1024) and the exposure digital code associated with the exposure limit.

Imaging system 1300 is arranged to digitally cancel the errors introduced by mismatches between the reset level generator circuit (see X1030 in FIG. 10) and the actual reset levels of the pixels. During the initial reset, the reset levels of the pixels are fed through the AFE/ADC circuits, and the resulting ADC output code is stored in the digital memory (instead of an analog memory as shown in FIG. 12). During the exposure interval, the AE pixels are repeatedly scanned and the corresponding output codes from the ADC are provided to the difference circuit, while the previously stored reset levels of the corresponding AE pixels are retrieved from the digital memory circuit and provided to the difference circuit. By subtracting the reset level of the AE pixels from the ADC output code corresponding to the same AE pixel as exposed, an accurate measurement of the integrated photocurrent signal for the AE pixel is obtained. The resulting code from the measurement is digitally compared to the exposure limit to determine when to assert the stop exposure signal.

Balancing Exposure Time and Gain

The detailed discussions found above illustrate exemplary systems that dynamically adjust the exposure time of a pixel array in an imaging system. In each of those detailed discussions, the exposure time described above employs an exemplary exposure time adjustment. According to the exposure time adjustment methods previously described, the exposure cycle is terminated when the signal level associated with at least one of the pixels exceeds the exposure threshold (e.g., 90% of the saturation limit for the pixel array).

Other exposure methods may be preferable in certain situations. In one example situation, it may be preferable to sacrifice SNR (signal-to-noise ratio) in the image for fast image capture. For this example, motion blur may occur in the image when the exposure time is excessive. In another example situation, it may be preferable to extend the integration time and maintain lower gains. For this example, maximizing the integration time for the pixel array reduces overall noise in the image.

Alternative image exposure methods may be employed to adjust the exposure time such that an optimal combination of exposure time and gain is achieved. The methods employed to balance exposure time and gain will be described in further detail below.

Optimizing Gain and Integration Time

The illumination level that is associated with a particular scene, combined with the motion speed of objects that are located in the scene, have a corresponding optimum exposure time and video gain. A series of graphs will be described below. Each graph includes a horizontal axis that corresponds to time during integration, and a vertical axis that corresponds to signal level as a percentage of total saturation. Lines on the graph indicate signals from the pixel array. Each line has an arrowhead that indicates an end of the integration time for that signal. Each line forms an angle with respect to the horizontal axis, where the angle corresponds to a particular illumination level.

Figure 14:
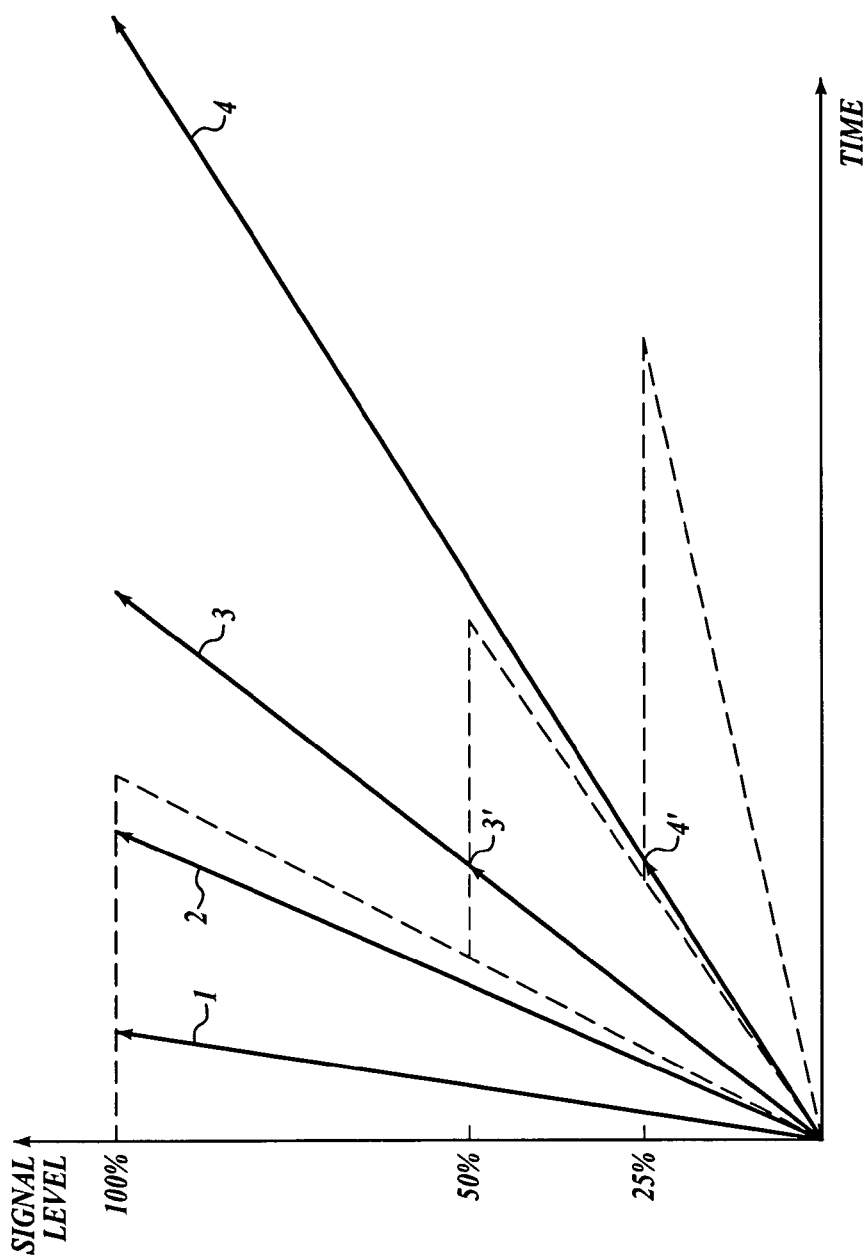
FIG. 14 is a diagram that is related to optimization of the gain and integration time in the system.

An exemplary signal graph is shown in FIG. 14, where the system is arranged to provide three different gain settings (1X, 2X, and 4X). The first signal (1) illustrates a signal that integrates up to 100% of the threshold in a short time period such that the first gain setting (1X) is appropriate. The angle associated with the first signal indicates a very high illumination level. The second signal (2) is also a high illumination level signal such that a gain of 1X is appropriate. The third signal (3) has a low illumination level such that a gain setting of 1X results in a signal that reaches 100% at a significantly later time than signals 1 and 2. The fourth signal (4) is a very low illumination level such that a gain setting of 1X results in a signal that reaches 100% an unacceptably long time after signals 1 and 2 have reached 100%. The third and fourth signals may result in high motion blur in the image since the integration times are so long.

Each gain settings can be described by a gain equation (G), $G=X^N$, where X is a constant and N is the gain setting index. For example, the gain settings illustrated in FIG. 14 corresponds to X=2, and N=0 to 2, resulting in gains of 1X, 2X, and 4X. However, any number of gain settings may be employed to improve the signal integrity. For example, when X=1.22, and N=0 to 7, the gain settings correspond to 1X, 1.2X, 1.5X, 1.8X, 2.2X, 2.7X, 3.3X, and 4.0X (which are linear on a dB scale).

By adjusting the gain levels for the signals, the integration time for a low illumination level signal can be shortened. Referring again to FIG. 14, the third signal (3) has an integration time that can be shortened to 3' by increasing the gain to 2X and reducing the integration threshold to the 50% level. Similarly, the fourth signal (4) has an integration time that can be shortened to 4' by increasing the gain to 4X and reducing the integration threshold to the 25% level.

The dotted line of FIG. 14 indicates a solution curve for gain and integration time as a function of illumination level. The choice of gain and integration time may be optimized for noise and motion blur. For highest light levels, low gains result in short integration times so that noise and motion blur is not a problem. For lowest light levels, the gain should be increased maximally to result in shortest integration times. However, the middle gain level may either be adjusted to the highest gain setting to reduce motion blur, or remain on the middle gain level to reduce noise in the image.

Figure 15:
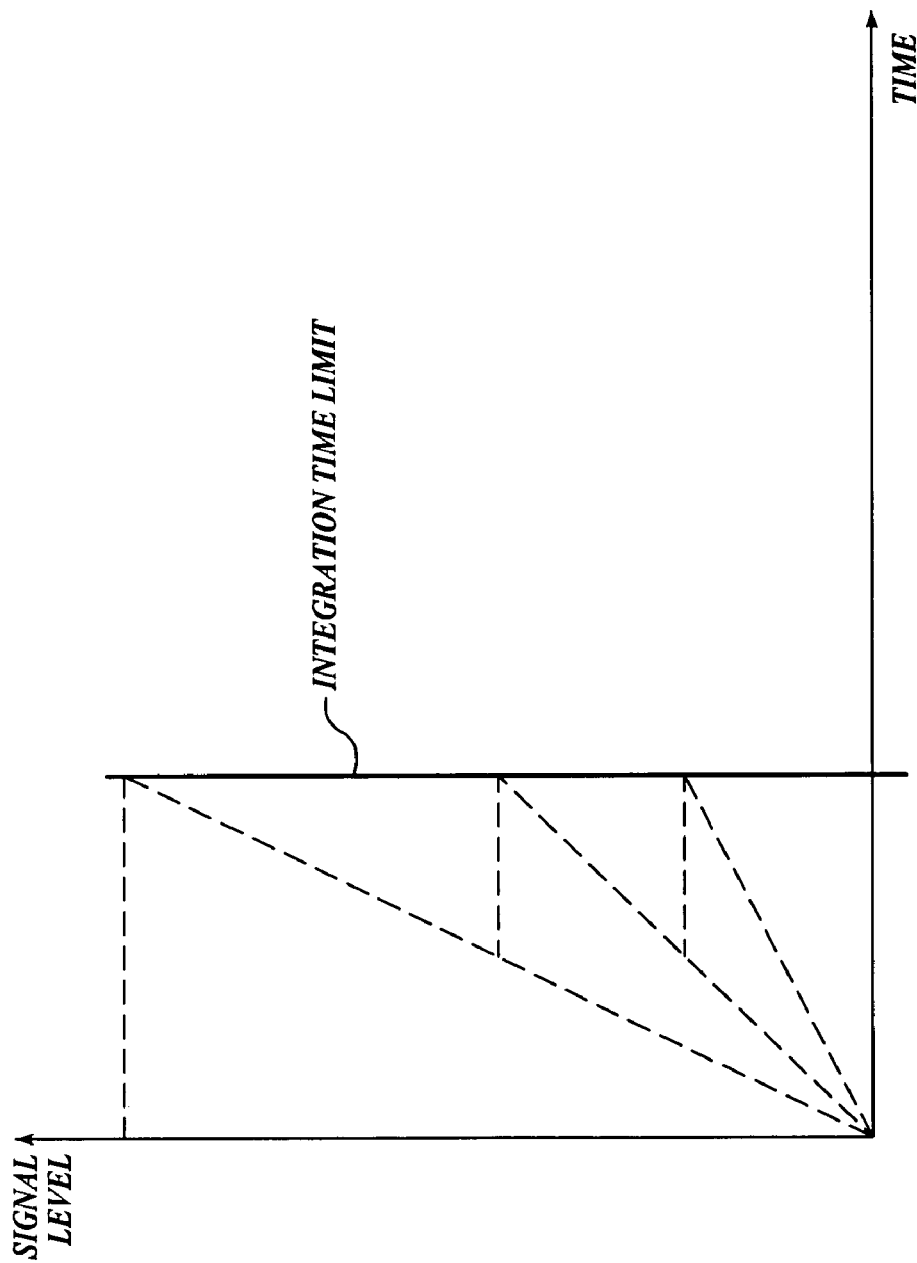
FIG. 15 is another diagram that is related to optimization of the gain and integration time in the system.
Figure 16:
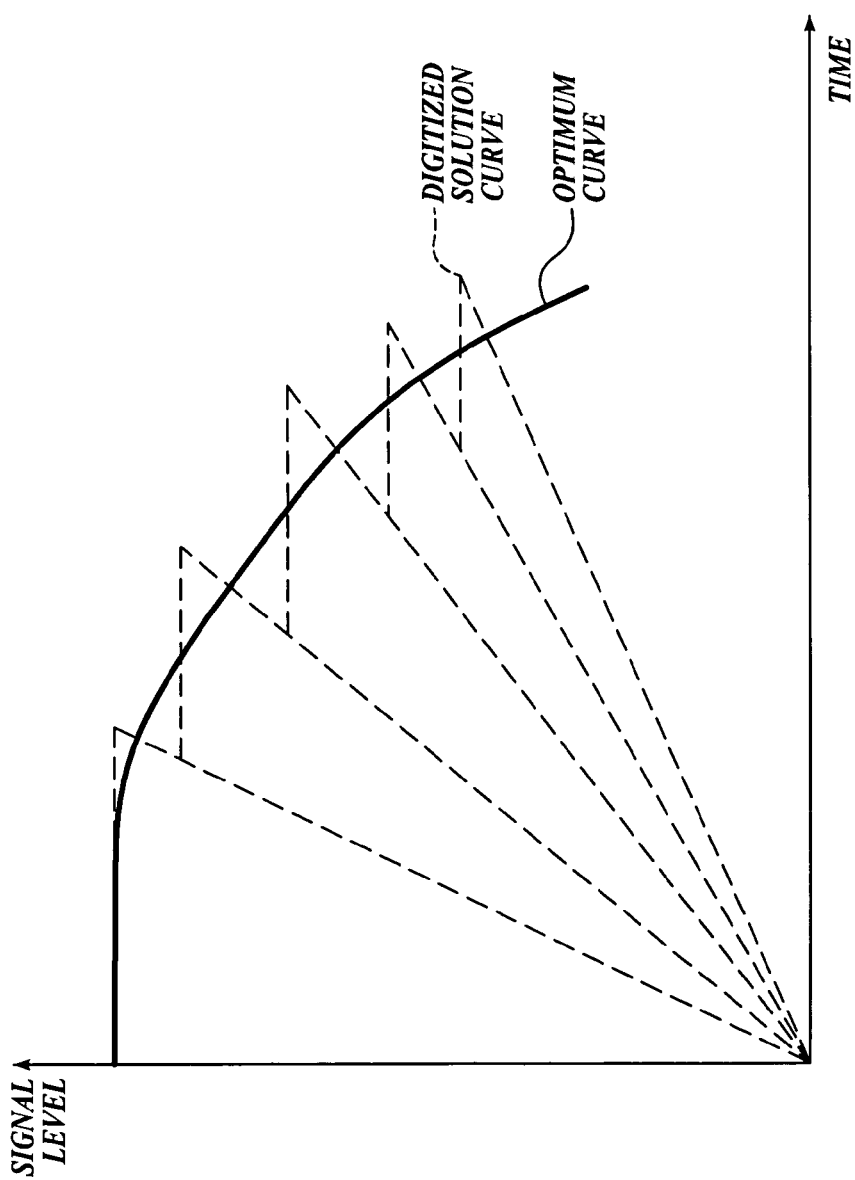
FIG. 16 is still another diagram that is related to optimization of the gain and integration time in the system.

A hard maximum time limit can be placed on the integration time to minimize motion blur. As shown in FIG. 15, the solution curve is bounded by the integration time limit. When a signal reaches the integration time limit on one setting, the gain of the system should be increased to the next setting, which reduces the integration time by a corresponding amount. The solution curve shown in FIG. 15 is not optimal because the same integration time, with different gain settings, is utilized for signal levels that have very high light levels and very low light levels. A better solution may be obtained by using less integration time for high light levels, and more integration time for low light levels. Motion blur is predominately due to longer integration times such that less integration time yields lower motion blur. An optimal solution curve can be found using mathematical modeling, where the sum of the distortions (from motion blur and noise) is minimized for each illumination level. The resulting curve has optimum exposure times and gains for minimal distortion. An example curve of optimized exposure times and gains is illustrated in FIG. 16.

Many different methods may be employed to approximate the optimum exposure time and gain settings. A first method is referred to as an extrapolative exposure method. A second method is referred to as an iterative exposure method. A third method is referred to as a modified iterative exposure method. A fourth method is referred to as an optimal exposure method.

Each of the described methods is utilized in an electronic imaging system such as those described with respect to FIGS. 1–5, FIG. 8, and FIGS. 10–13. In one example, the exposure threshold for threshold detector X11 in FIG. 1 is adjusted according to one of the methods. In another example, the control signal for reference circuit X42 in FIG. 4 is adjusted according to one of the methods. In still another example, threshold level generators X1022 in FIGS. 10–13 are adjusted according to one of the methods.

As described previously with respect to FIG. 6, blocks 626–636 comprise an exposure process that is arranged to continuously check the signal levels of the sparse readout pixels during the exposure interval. Also discussed previously, blocks 720–740 in FIG. 7 comprise an exposure process that is arranged to continuously check the signal levels of the sparse readout pixels, via peak signal detectors, during the exposure interval. One of the approximation methods described below may be employed in place of blocks 626–636 in FIG. 6, or in place of blocks 720–740 in FIG. 7. In each of the described methods, exposure may be started by an exposure means such as, for example, at least one of opening a mechanical shutter, activating an electronic shutter, and activating a light source (e.g., an LED). Each pixel in the array receives light that is reflected from the scene, while the exposure means is actuated. The comparison step in the exposure interval may be accomplished by any means for comparing such as comparators CMP40 and CMP50 illustrated in FIGS. 4–5, where the reset level of each selected pixel is accounted for in the comparison. Exposure may be stopped by at least one of closing a mechanical shutter, deactivating an electronic shutter, and deactivating a light source (e.g., an LED).

Extrapolative Exposure Method

Figure 17:
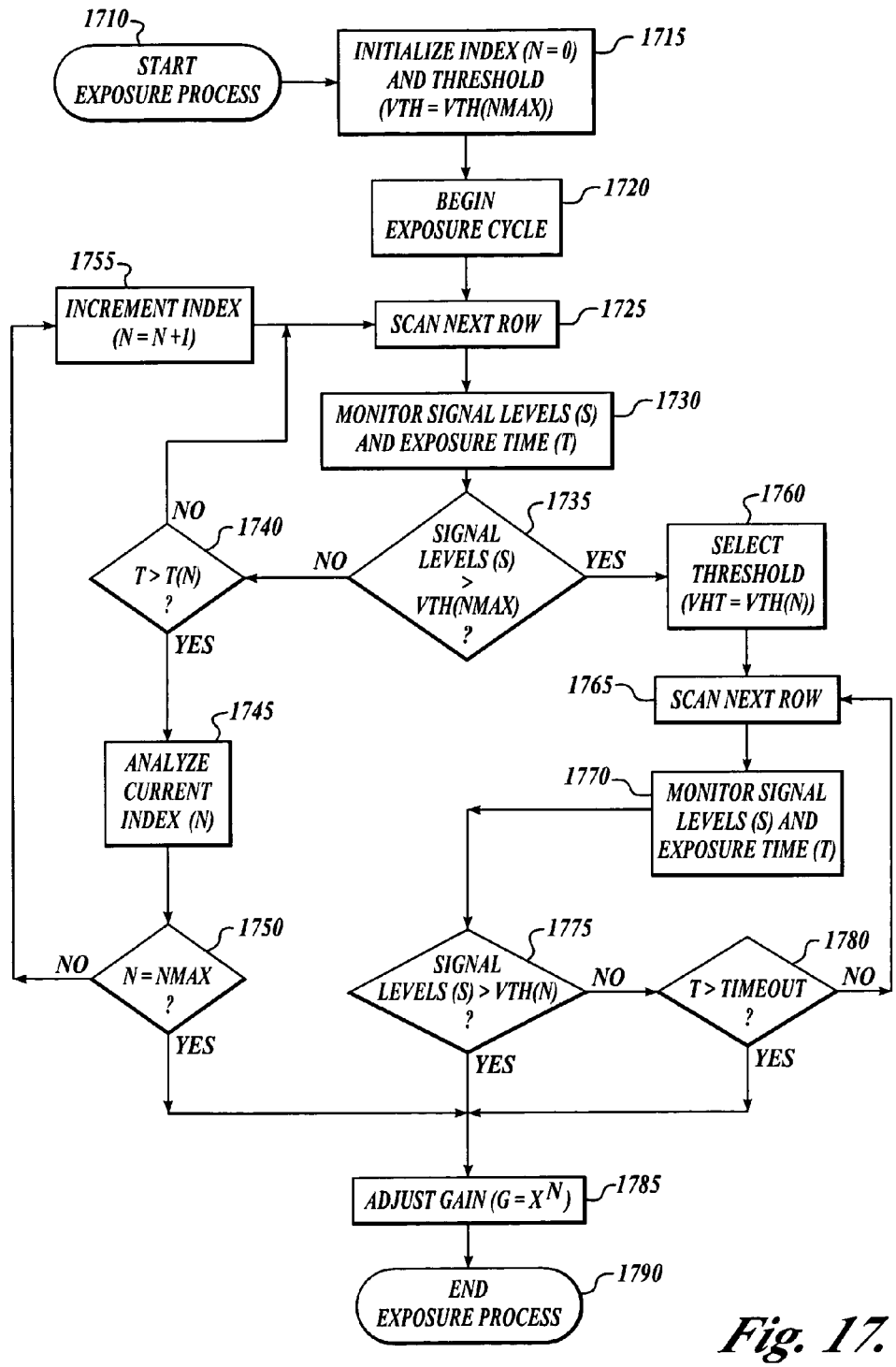
FIG. 17 is a procedural flow diagram of an exemplary extrapolative method.

FIG. 17 is a procedural flow diagram of an extrapolative exposure method that is arranged to optimize the exposure time and the gain in accordance with the present invention.

The exposure process is started at block 1710. At block 1715 an indexing variable (n) is initialized to zero (n=0), and the current threshold limit (VTH) is initialized to the threshold of the highest index (VTH=VTH(NMAX)). Proceeding to block 1720 the exposure cycle is started (e.g., the shutter is opened so that the pixel array is exposed). Flowing to block 1725, the next row in the pixel array is scanned for the sparse pixels. Continuing to block 1730, the system monitors the current exposure time (T) and the current signal levels (S) associated with each selected sparse readout pixel. Flowing to decision block 1735, the signal levels for the sparse readout pixels are compared to a threshold level associated with highest index (NMAX). Processing flows from decision block 1735 to decision block 1760 when the signal levels (S) exceed the threshold level associated with the highest index (S>VTH(NMAX)). Otherwise, processing flows from decision block 1735 to decision block 1740.

At decision block 1740, the current exposure time (T) is compared to the maximum exposure time (T(N)) for the currently selected index (N). Processing flows from decision block 1740 to block 1745 when the current exposure time (T) exceeds the maximum exposure time for the currently selected index (T>T(N)). Otherwise, processing flows from decision block 1740 to block 1725, where the next row in the pixel array is scanned. When the last row of the pixel array has been scanned, the next row corresponds to the first row in the pixel array.

At block 1745, the current index (N) is analyzed. At decision block 1750, the current index (N) is compared to the maximum index (NMAX). Processing continues from decision block 1750 to block 1785 when the current index equals the maximum value for the index (N=NMAX). Otherwise, processing continues from decision block 1750 to block 1755.

At block 1755, the current index is incremented (N=N+1). Processing continues from block 1755 to block 1725, where the next row in the pixel array is scanned.

At block 1760, the threshold is selected according to the current value associated with the index (VTH=VTH(N)). Continuing to block 1765, the next row of the pixel array is scanned. Flowing to block 1170, the system monitors the current exposure time (T) and the current signal levels (S) associated with each selected sparse readout pixel. Continuing to decision block 1775, the signal levels for the sparse readout pixels are compared to a threshold level associated with the current index (N). Processing flows from decision block 1775 to block 1780 when the signal levels (S) exceed the threshold level associated with the current index (S>VTH(N)). Otherwise, processing flows from decision block 1775 to decision block 1780.

At decision block 1780, the current exposure time (T) is compared to the exposure timeout limit (Timeout). In one example, the exposure timeout limit corresponds to a maximum time limit for integration in the system. In another example, the exposure timeout limit is selected from an indexed timeout condition array that is indexed according to the currently selected index (N). The timeout is provided such that the system will not integrate indefinitely, such as when the image goes completely dark (e.g., the light source is deactivated). Processing flows from decision block 1780 to block 1785 when the current exposure time (T) exceeds the exposure timeout limit (Timeout). Otherwise, processing flows from decision block 1780 to block 1765, where the next row in the pixel array is scanned. When the last row of the pixel array has been scanned, the next row corresponds to the first row in the pixel array.

Processing reaches block 1785 after the end of exposure time interval has been reached. At block 1785, the gain of the system is adjusted based on the current index. The gain is adjusted according to the equation $G=X^N$, where X is a constant and N is the currently selected index as previously discussed. The selected gain (G) and threshold (VTH) are associated with the index after the exposure time interval is completed. Processing flows from block 1785 to block 1790 where the exposure process is terminated.

Processing blocks 1725–1755 comprises an initial scan process, while blocks 1760–1780 comprise a final scan process. During each of the scan processes the signal levels of the sparse readout pixels are scanned while being exposed. Exposure may be started by an exposure means such as, for example, at least one of opening a mechanical shutter, activating an electronic shutter, and activating a light source (e.g., an LED). Each pixel in the array receives light that is reflected from the scene, while the exposure means is actuated. The comparison step (e.g., blocks 1735, 1775) may be accomplished by any means for comparing such as comparators CMP40 and CMP50 illustrated in FIGS. 4–5, where the reset level of each selected pixel is accounted for in the comparison. Exposure may be stopped by at least one of closing a mechanical shutter, deactivating an electronic shutter, and deactivating a light source (e.g., an LED).

Figure 18:
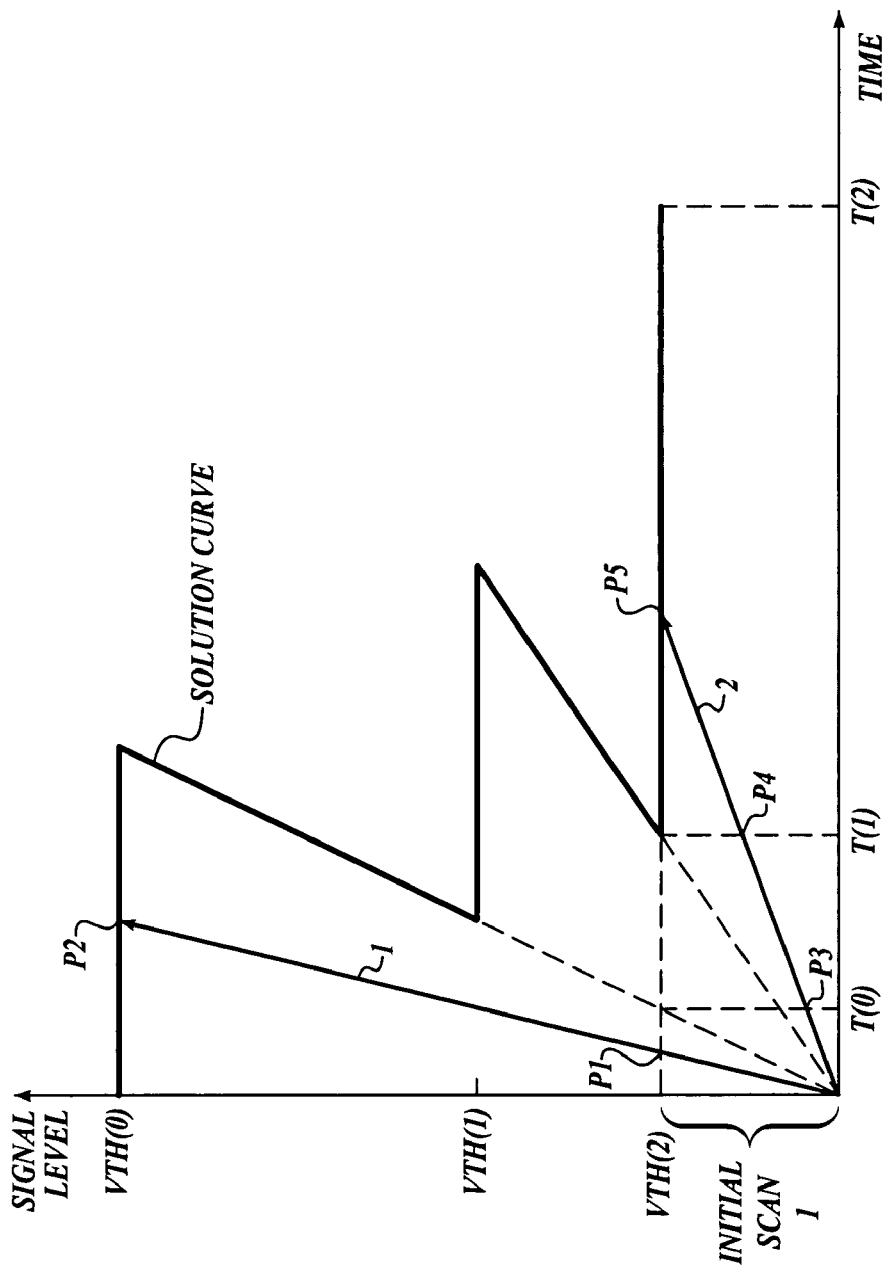
FIG. 18 is a diagram of exemplary signals that employ the extrapolative method.

FIG. 18 illustrates a solution curve that might be employed by the extrapolative exposure process that is illustrated in FIG. 17. For FIG. 17, NMAX=2, three exposure thresholds (VTH(0)–VTH(2)) are provided, and three corresponding exposure time limits (T(0)–T(2)) are also provided. As described previously, the angle of a line on the graph with respect to the horizontal axis (time) corresponds to a particular illumination level.

In one example, the processing method described with respect to FIG. 17 is employed with a highly illuminated image having signal levels as indicated by 1. The initial scan process continues until the signal levels (1) correspond to VTH(NMAX)=VTH(2), such as at point P1. After point P1, the initial scan process is concluded and the final scan process begins. The final scan process continues until the image signals (1) reach threshold limit VTH(0) at point P2.

In another example, the processing method described with respect to FIG. 17 is employed with a poorly illuminated image having signal levels as indicated by 2. During the initial scan process the signal levels (2) do not reach VTH(2) before exposure time limit T(0) is reached at point P3. After point P3, the initial scan process continues, and signal level 2 reaches exposure time limit T(1) before threshold VTH(2) is reached at point P4. The initial scan process continues and signal level 2 reaches threshold VTH(NMAX)=VTH(2) before exposure time limit T(2) is reached. Note that for a poorly illuminated image, the final scan process becomes unnecessary.

Iterative Exposure Method

Figure 19:
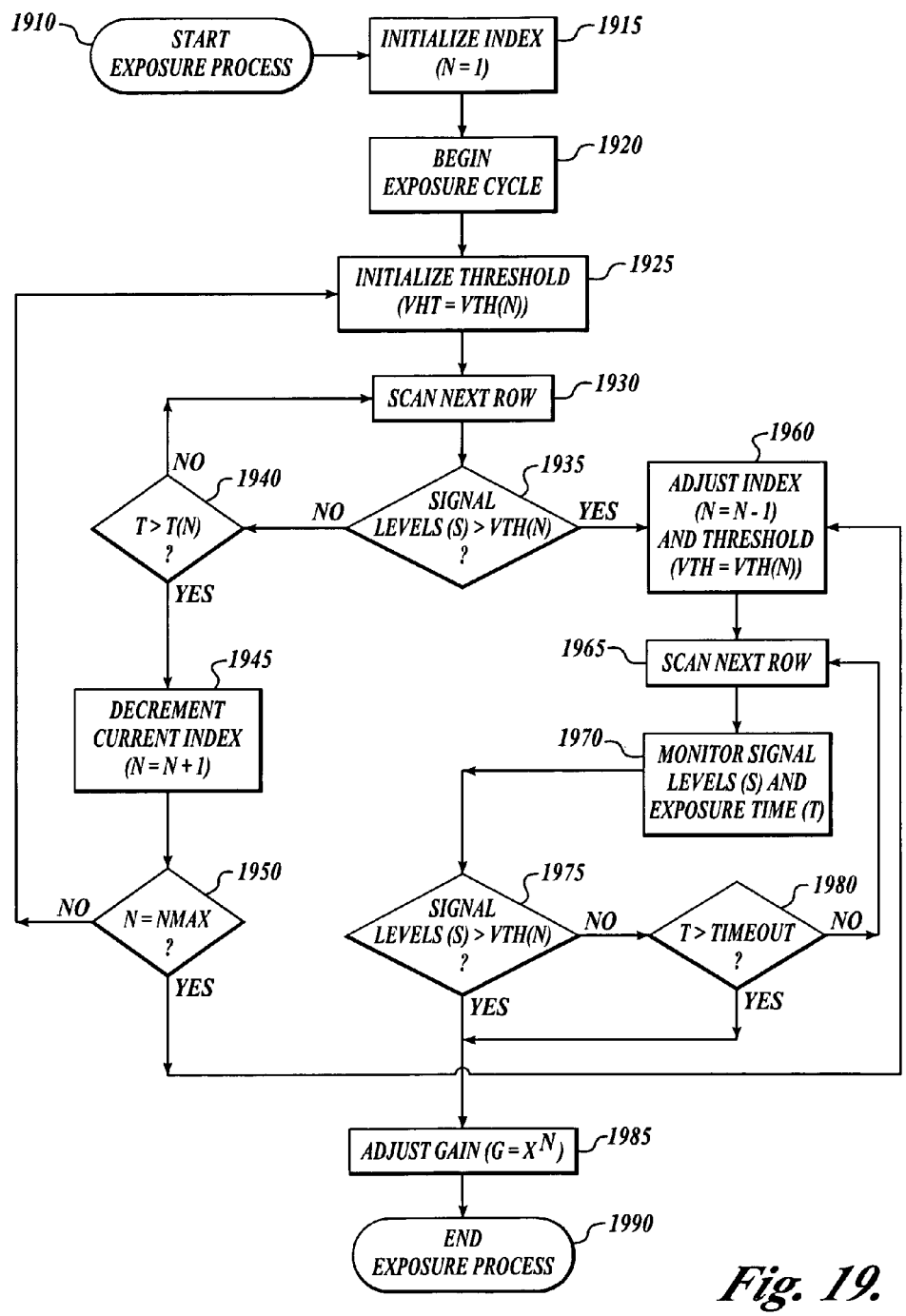
FIG. 19 is a procedural flow diagram of an exemplary iterative method.

FIG. 19 is a procedural flow diagram of an iterative exposure method that is arranged to optimize the exposure time and the gain in accordance with the present invention.

The exposure process is started at block 1910. At block 1915 an indexing variable (n) is initialized to one (N=1). Proceeding to block 1920 the exposure cycle is started (e.g., the shutter is opened so that the pixel array is exposed). Flowing to block 1925, the current threshold (VTH) is initialized to the threshold that is indexed by one (VTH=VTH(1)). Continuing to block 1930, the next row in the pixel array is scanned for the sparse pixels. The current signal levels (S) associated with each selected sparse readout pixel are also monitored. Flowing to decision block 1935, the signal levels for the sparse readout pixels are compared to a threshold level associated with current index (VTH(N)). Processing flows from decision block 1935 to decision block 1960 when the signal levels (S) exceed the threshold level associated with the current threshold level (S>VTH(N)). Otherwise, processing flows from decision block 1935 to decision block 1940.

At decision block 1940, the current exposure time (T) is compared to the maximum exposure time (T(N)) for the currently selected index (N). Processing flows from decision block 1940 to block 1945 when the current exposure time (T) exceeds the maximum exposure time for the currently selected index (T>T(N)). Otherwise, processing flows from decision block 1940 to block 1930, where the next row in the pixel array is scanned. When the last row of the pixel array has been scanned, the next row corresponds to the first row in the pixel array.

At block 1945, the current index (N) is incremented (N=N+1). At decision block 1950, the current index (N) is compared to the maximum index (NMAX). Processing continues from decision block 1950 to block 1960 when the current index equals the maximum value for the index (N=NMAX). Otherwise, processing continues from decision block 1950 to block 1925, where the current threshold is set to the now incremented index (VTH=VTH(N)).

At block 1960, the current index is decremented (N=N–1), and the current threshold is set to the now decremented index (VTH=VTH(N)). Continuing to block 1965, the next row of the pixel array is scanned for sparse pixels. Flowing to block 1970, the system monitors the current exposure time (T) and the current signal levels (S) associated with each selected sparse readout pixel. Continuing to decision block 1975, the signal levels for the sparse readout pixels are compared to a threshold level associated with the current index (N). Processing flows from decision block 1975 to block 1980 when the signal levels (S) exceed the threshold level associated with the current index (S>VTH(N)). Otherwise, processing flows from decision block 1975 to decision block 1980.

At decision block 1980, the current exposure time (T) is compared to the exposure timeout limit (Timeout). In one example, the exposure timeout limit corresponds to a maximum time limit for integration in the system. In another example, the exposure timeout limit is selected from an indexed timeout condition array that is indexed according to the currently selected index (N). The timeout is provided such that the system will not integrate indefinitely, such as when the image goes completely dark (e.g., the light source is deactivated). Processing flows from decision block 1980 to block 1985 when the current exposure time (T) exceeds the exposure timeout limit (Timeout). Otherwise, processing flows from decision block 1980 to block 1965, where the next row in the pixel array is scanned. When the last row of the pixel array has been scanned, the next row corresponds to the first row in the pixel array.

Processing reaches block 1985 after the end of exposure time interval has been reached. At block 1985, the gain of the system is adjusted based on the current index. The gain is adjusted according to the equation $G=X^N$, where X is a constant and N is the currently selected index as previously discussed. The selected gain (G) and threshold (VTH) are associated with the index after the exposure time interval is completed. Processing flows from block 1985 to block 1990 where the exposure process is terminated.

Processing blocks 1925–1950 comprises an initial scan process, while blocks 1960–1980 comprise a final scan process. During each of the scan processes the signal levels of the sparse readout pixels are scanned while being exposed. Exposure may be started by an exposure means such as, for example, at least one of opening a mechanical shutter, activating an electronic shutter, and activating a light source (e.g., an LED). Each pixel in the array receives light that is reflected from the scene, while the exposure means is actuated. The comparison step (e.g., blocks 1935, 1975) may be accomplished by any means for comparing such as comparators CMP40 and CMP50 illustrated in FIGS. 4–5, where the reset level of each selected pixel is accounted for in the comparison. Exposure may be stopped by at least one of closing a mechanical shutter, deactivating an electronic shutter, and deactivating a light source (e.g., an LED).

Figure 20:
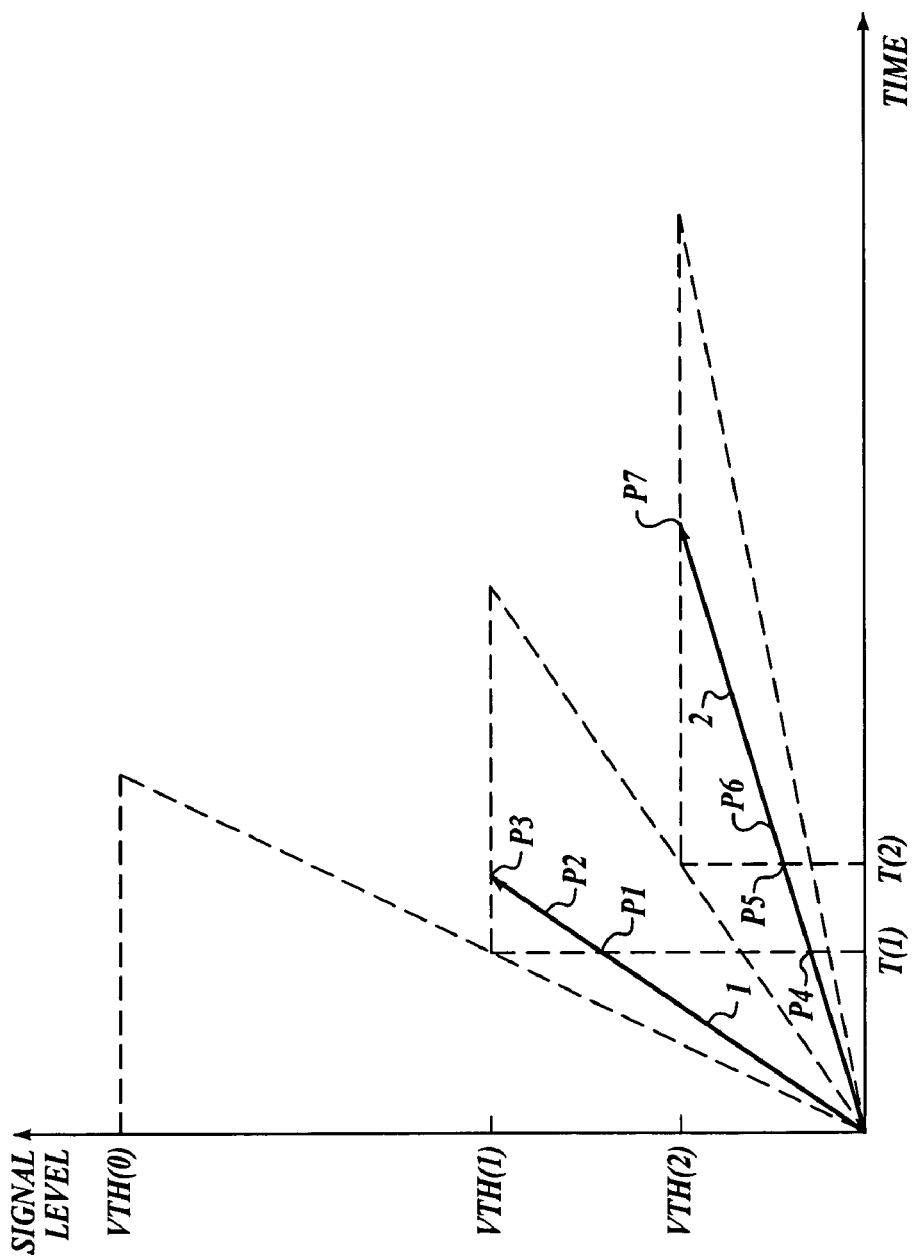
FIG. 20 is a diagram of exemplary signals that employ the iterative method.

FIG. 20 illustrates a solution curve that might be employed by the iterative exposure process that is illustrated in FIG. 19. For FIG. 19, NMAX=3, three exposure thresholds (VTH(0)–VTH(2)) are provided, and three corresponding exposure time limits (T(0)–T(2)) are also provided. As described previously, the angle of a line on the graph with respect to the horizontal axis (time) corresponds to a particular illumination level.

In one example, the processing method described with respect to FIG. 20 is employed with a highly illuminated image having signal levels as indicated by 1. The threshold in the initial scan process starts at VTH(1), and continues up until point P1. At point P1, the signal level is still below VTH(1) and the threshold is decreased to VTH(2) by incrementing the index (N=N+1). Since the signal level is already above VTH(2) at point P1, the threshold level is increased back to VTH(1) when the final scan process starts at point P2. After point P2, the signal level continues to integrate until the VTH(1) threshold level is reached at point P3.

In another example, the processing method described with respect to FIG. 20 is employed with a poorly illuminated image having signal levels as indicated by 2. The threshold in the initial scan process again starts at VTH(1), and continues up until point P4. At point P4, the signal level is still below VTH(1) and the threshold is decreased to VTH(2) by incrementing the index (N=N+1). Since the signal level is below VTH(2) at point P4, the initial scan process continues to point P5. After point P5, the current exposure time (T) exceeds exposure time limit T(2), and the threshold is decreased to VTH(3). Since VTH(3) does not exist in this example, the default threshold level corresponds to zero. The final scan process is initiated since the signal level is above threshold VTH(3). At the start of the final scan process, the threshold level is increased to VTH(2) at point P6. The signal continues to integrate until the VTH(2) threshold level is reached at point P7.

Alternative Iterative Exposure Method

Figure 21:
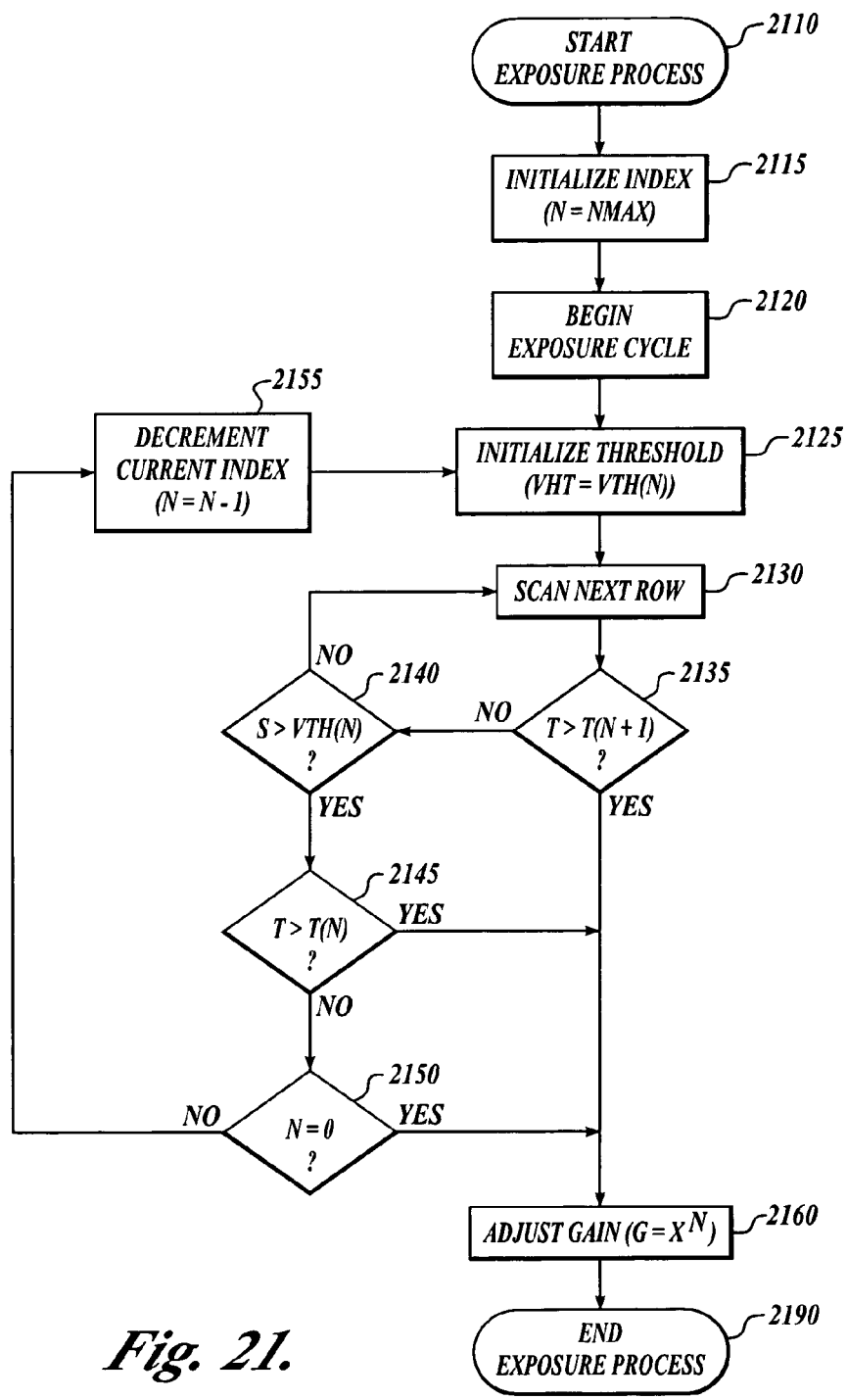
FIG. 21 is a procedural flow diagram of an exemplary alternative iterative method.

FIG. 21 is a procedural flow diagram of an alternative iterative exposure method that is arranged to optimize the exposure time and the gain in accordance with the present invention.

The exposure process is started at block 2110. At block 2115 an indexing variable (n) is initialized to the highest index (N=NMAX). Proceeding to block 2120 the exposure cycle is started (e.g., the shutter is opened so that the pixel array is exposed). Flowing to block 2125, the current threshold (VTH) is initialized to the currently indexed threshold (VTH=VTH(N)). Continuing to block 2130, the next row in the pixel array is scanned for the sparse pixels. The current signal levels (S) associated with each selected sparse readout pixel are also monitored. Processing continues at decision block 2135.

At decision block 2135, the current exposure time (T) is compared to the exposure time interval that is associated with the next index (T(N+1)). Processing flows from decision block 2135 to block 2160 when the current exposure time (T) exceeds the exposure time interval that is associated with the next index (T>T(N+1)). Otherwise, Processing flows from decision block 2135 to decision block 2140 when the current exposure time (T) fails to exceed the exposure time interval that is associated with the next index.

At decision block 2140, the signal levels for the sparse readout pixels are compared to a threshold level associated with current index (VTH(N)). Processing flows from decision block 2140 to decision block 2145 when the signal levels (S) exceed the threshold level associated with the current threshold level (S>VTH(N)). Otherwise, processing flows from decision block 2140 to block 2130, when the next row of the pixel array is scanned for sparse pixels. When the last row of the pixel array has been scanned, the next row corresponds to the first row in the pixel array.

At decision block 2145, the current exposure time (T) is compared to the exposure time interval that is associated with the current index (T(N)). Processing flows from decision block 2145 to block 2160 when the current exposure time (T) exceeds the exposure time interval that is associated with the current index (T>T(N)). Otherwise, processing flows from decision block 2145 to block 2150 when the current exposure time (T) fails to exceed the exposure time interval that is associated with the current index.

At decision block 2150, the current index (N) is compared to zero. Processing flows from decision block 2150 to block 2160 when the current index is zero. Otherwise, processing flows from decision block 2150 to block 2155 when the current index is different from zero.

At block 2155, the current index is decremented (N=N−1). Processing flows from block 2155 to block 2125, where the current threshold is selected by the now decremented index as VTH(N).

At block 2160, the gain of the system is adjusted based on the current index. The gain is adjusted according to the equation $G=X^N$, where X is a constant and N is the currently selected index as previously discussed. The selected gain (G) and threshold (VTH) are associated with the index after the exposure time interval is completed. Processing flows from block 2160 to block 2190 where the exposure process is terminated.

During each of the scan processes the signal levels of the sparse readout pixels are scanned while being exposed. Exposure may be started by an exposure means such as, for example, at least one of opening a mechanical shutter, activating an electronic shutter, and activating a light source (e.g., an LED). Each pixel in the array receives light that is reflected from the scene, while the exposure means is actuated. The comparison step (e.g., blocks 2135, 2140) may be accomplished by any means for comparing such as comparators CMP40 and CMP50 illustrated in FIGS. 4–5, where the reset level of each selected pixel is accounted for in the comparison. Exposure may be stopped by at least one of closing a mechanical shutter, deactivating an electronic shutter, and deactivating a light source (e.g., an LED).

Figure 22:
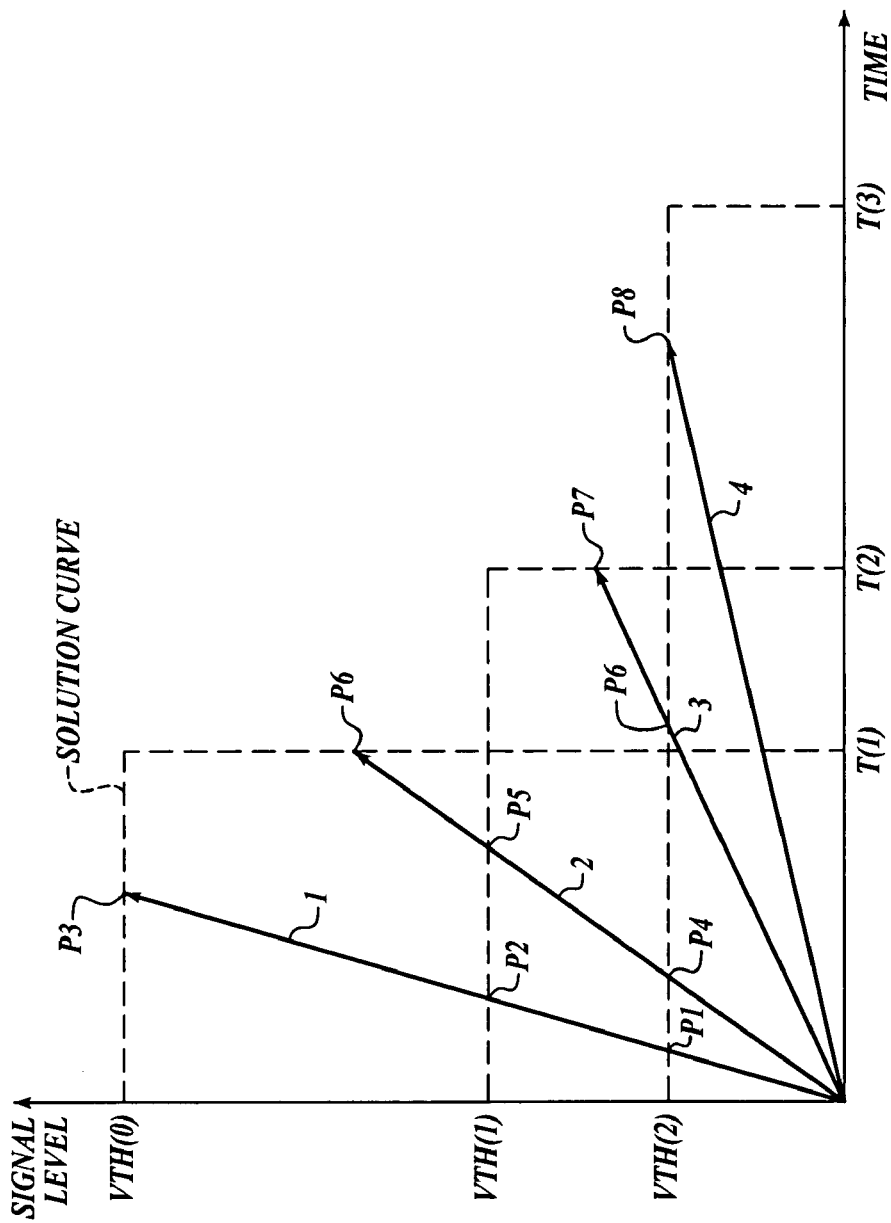
FIG. 22 is a diagram of exemplary signals that employ the alternative iterative method.

FIG. 22 illustrates a solution curve that might be employed by the alternative iterative exposure process that is illustrated in FIG. 21. For FIG. 22, NMAX=2, three exposure thresholds (VTH(0)–VTH(2)) are provided, and three corresponding exposure time limits (T(1)–T(3)) are also provided. As described previously, the angle of a line on the graph with respect to the horizontal axis (time) corresponds to a particular illumination level.

In one example, the processing method described with respect to FIG. 21 is employed with a highly illuminated image having signal levels as indicated by signal 1 in FIG. 22. Initially the threshold level is initialized to the highest indexed threshold level VTH(NMAX)=VTH(2). The signal level begins integrating as a result of the exposure of the pixel array. Integration continues up to point P1, where the signal level reaches VTH(2) and the threshold is increased to VTH(1) by decrementing the index (N=N−1). The signal level continues to integrate to threshold level VTH(1) at point P2, where the threshold level is increased to VTH(0). Integration continues up until point P3, where the signal level reaches VTH(0).

In another example, the processing method described with respect to FIG. 21 is employed with another highly illuminated image having signal levels as indicated by signal 2 in FIG. 22. Initially the threshold level is initialized to the highest indexed threshold level VTH(NMAX)=VTH(2). The signal level begins integrating as a result of the exposure of the pixel array. Integration continues up to point P4, where the signal level reaches VTH(2) and the threshold is increased to VTH(1) by decrementing the index (N=N−1). The signal level continues to integrate to threshold level VTH(1) at point P5, where the threshold level is increased to VTH(0). Integration continues up until point P6, where exposure time limit T(1) is reached prior to the signal level reaching VTH(0). Since the signal levels are not integrated up to 100% of one of the threshold limits, no one gain setting will normalize the signal levels to a 100% level. In this case, the largest gain level that does not result in saturation is selected. For example, a signal level that reaches 75% of saturation would optimally have a gain of 100/75 to normalize the signal level to the maximum. Since the gain level of 100/75 may not be available, the next lower gain is selected. (e.g., when the gain settings are 1, 2, and 4, the gain setting of 1 is selected). Additional signal processing (e.g., digital gain) may be employed to increase the signal levels to a full-scale signal level.

In still another example, the processing method described with respect to FIG. 21 is employed with a moderately illuminated image having signal levels as indicated by signal 3 in FIG. 22. Initially the threshold level is initialized to the highest indexed threshold level VTH(NMAX)=VTH(2). The signal level begins integrating as a result of the exposure of the pixel array. Integration continues up to point P6, where the signal levels reach threshold level VTH(2). At point P6, the threshold level is adjusted to VTH(1) and the exposure time limit is changed to exposure time limit T(2) by decrementing the index (N=N−1). The signal levels continue to integrate until exposure time limit T(2) is reached at point P7. The exposure time limit T(2) is reached prior to the signal level reaching VTH(1). Since the signal levels are not integrated up to 100% of one of the threshold limits, no one gain setting will normalize the signal levels to a 100% level. Additional signal processing (e.g., digital gain) may be employed to increase the signal levels to a full-scale signal level.

In yet another example, the processing method described with respect to FIG. 21 is employed with a moderately illuminated image having signal levels as indicated by signal 4 in FIG. 22. Initially the threshold level is initialized to the highest indexed threshold level VTH(NMAX)=VTH(2). The signal level begins integrating as a result of the exposure of the pixel array. Integration continues up to point P8, where the signal levels reach threshold level VTH(2). Since the signal levels are integrated up to 100% of one of the threshold limits, the corresponding gain setting will normalize the signal levels to a 100% level and no additional signal processing is required.

Optimal Exposure Method

Figure 23:
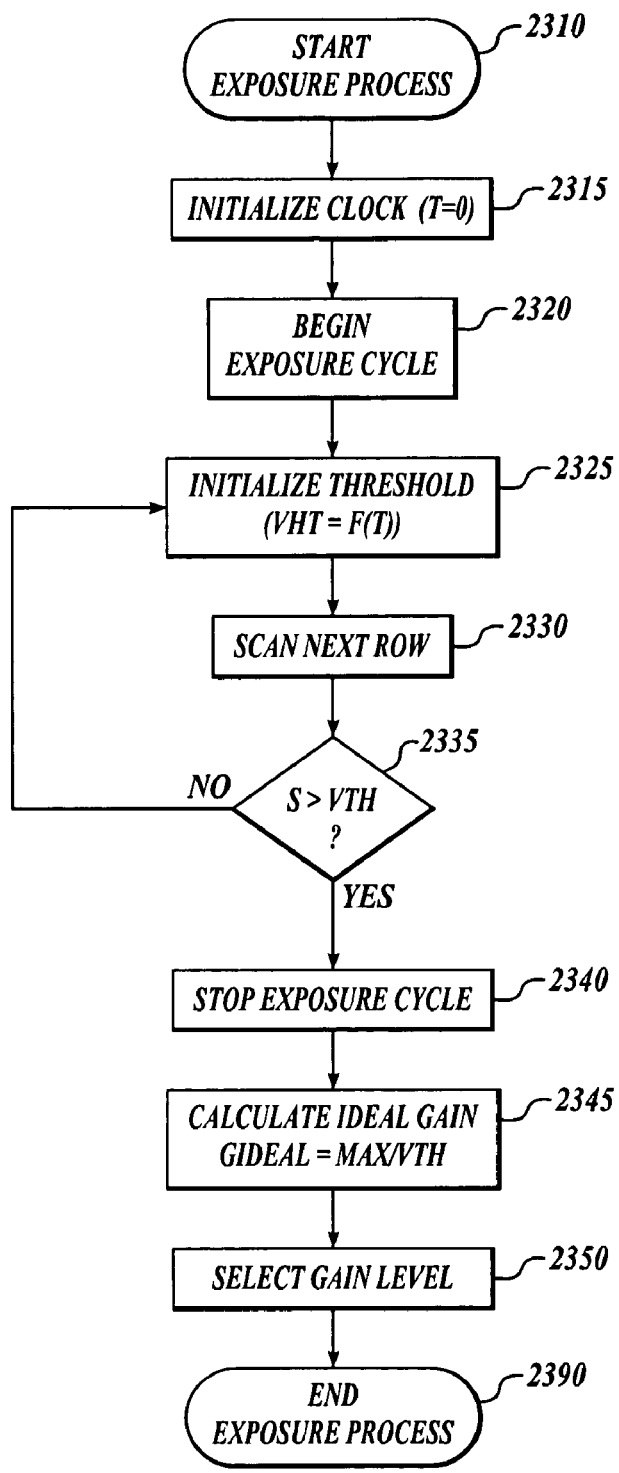
FIG. 23 is a procedural flow diagram of an exemplary optimal exposure method.

FIG. 23 is a procedural flow diagram of an optimal exposure method that is arranged to optimize the exposure time and the gain in accordance with the present invention.

The exposure process is started at block 2310. At block 2315 the exposure time clock (T) is initialized. In one example, the exposure time clock is initialized to zero. In another example, the current clock is recorded to note the start of the exposure cycle. Processing continues at block 2320, where the exposure cycle is started (e.g., the shutter is opened so that the pixel array is exposed). Processing flows from block 2320 to block 2325, where the current threshold (VTH) is initialized according to an optimal solution curve in response to the exposure time clock (T).

Processing flows from block 2325 to block 2330, where the next row in the pixel array is scanned for the sparse pixels. The current signal levels (S) associated with each selected sparse readout pixel are also monitored. Processing continues at decision block 2335, where the signal levels for the sparse readout pixels are compared to the currently selected threshold level. Processing flows from decision block 2335 to block 2340 when the signal levels (S) exceed the selected threshold level (S>VTH). Otherwise, processing flows from decision block 2335 to block 2325, where the threshold level is adjusted according to the optimal solution curve and the next row of the pixel array is scanned for sparse pixels. When the last row of the pixel array has been scanned, the next row corresponds to the first row in the pixel array.

At block 2340, the exposure cycle is terminated (e.g., the shutter is closed so that the pixel array is no longer exposed). Flowing to block 2345, the ideal gain (GIDEAL) is calculated by the maximum signal level (MAX) and the currently selected threshold level (VTH) as GIDEAL=MAX/VTH. The ideal gain corresponds to the gain that is required to restore the signal level to 100%. Processing continues from block 2345 to block 2350 where the gain level that most closely corresponds to the ideal gain is selected. The result of the ideal gain calculation may not correspond to an available gain setting of the programmable amplifier inside the imaging system. In that case, the calculated gain value has to be rounded off. Rounding off will usually be done to a lower available gain value, to avoid over-saturating the output of the system after the programmable amplifier. Processing flows from block 2160 to block 2190 where the exposure process is terminated.

During each of the scan processes the signal levels of the sparse readout pixels are scanned while being exposed. Exposure may be started by an exposure means such as, for example, at least one of opening a mechanical shutter, activating an electronic shutter, and activating a light source (e.g., an LED). Each pixel in the array receives light that is reflected from the scene, while the exposure means is actuated. The comparison step (e.g., block 2335) may be accomplished by any means for comparing such as comparators CMP40 and CMP50 illustrated in FIGS. 4–5, where the reset level of each selected pixel is accounted for in the comparison. Exposure may be stopped by at least one of closing a mechanical shutter, deactivating an electronic shutter, and deactivating a light source (e.g., an LED).

Figure 24:
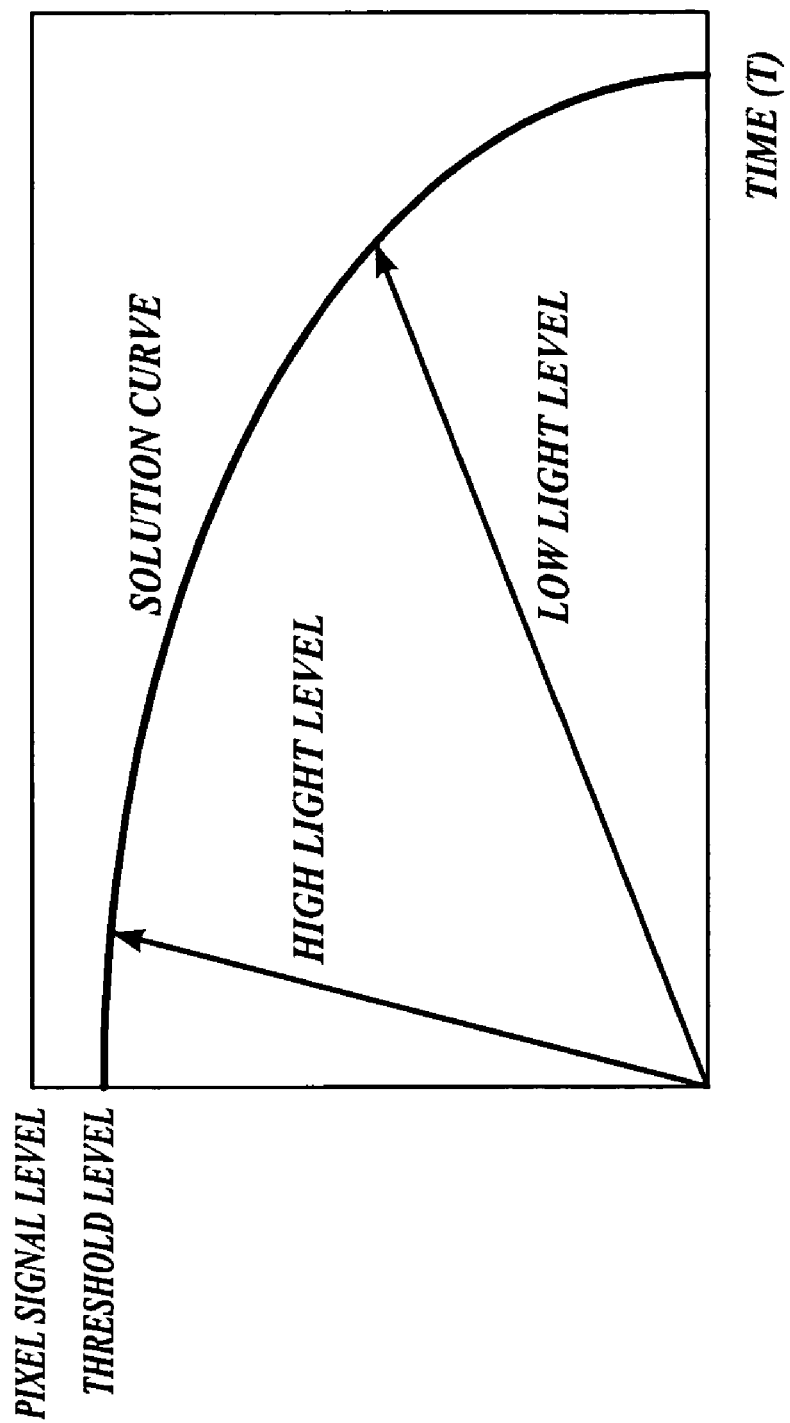
FIG. 24 is a diagram of exemplary signals that employ the optimal exposure method, which is arranged in accordance with the present invention.

FIG. 24 illustrates a solution curve that might be employed by the optimal exposure method that is illustrated in FIG. 23. The optimal solution curve has a series of exposure thresholds with matching exposure times. The optimal solution curve may be obtained through mathematical modeling, a collection of data, or any other type of method to determine the optimal solution curve. The optimal solution curve may be stored in the electronic system as a look-up table that is referenced according to an index, a set of data-point using interpolation methods (linear, non-linear, or a combination) between adjacent data-points, or a mathematical function. The exposure threshold is retrieved from the optimal solution curve according to the exposure time clock, or a calculated offset from the current exposure time.

During an example exposure cycle, the current exposure time continues to increase and the exposure threshold is repeatedly adjusted according to the current exposure time. For high light levels, the pixels should integrate to 100% of their saturation level since the integration time is relatively short. For light levels that are slightly lower, very short integration time (low motion blur) and a very low gain (low noise) result in poor images. The system is arranged to use a longer integration time and a higher gain level for lower light levels. Although the system will tradeoff some image quality due to motion blur and noise, the total loss of image quality is minimized. The total loss of image quality is less than would result with only a longer integration, or only a higher gain. For low light levels, higher gain and longer exposure times are required. The optimal exposure threshold method optimizes the balance between exposure time and gain by making the threshold level a decreasing function of time.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for balancing an exposure time and a gain for pixels in a pixel array system, the method comprising:
    starting an exposure time interval;
    selecting an exposure threshold in response to a current exposure time;
    scanning the signal levels associated with sparse pixels, wherein the sparse pixels corresponds to a selected group of pixels from the pixel array;
    repeating the steps of selecting the exposure threshold and scanning the signal levels when the scanned signal levels fail to exceed the selected exposure threshold;
    terminating the exposure time interval when at least one of the scanned signal levels exceed the selected exposure threshold; and
    selecting a gain setting that is associated with the selected exposure threshold when the exposure time interval is terminated.

2. The method of claim 1, wherein selecting the exposure threshold corresponds to selecting the exposure threshold according to an optimal solution curve.

3. The method of claim 2, wherein the optimal solution curve is determined by at least one of a mathematical model, and a collection of data.

4. The method of claim 2, wherein the exposure threshold is selected by at least one of retrieving the exposure threshold from a look-up table according to the current exposure time, and computing the exposure threshold according to a mathematical relationship between the exposure threshold and the current exposure time.

5. The method of claim 1, wherein selecting the gain setting further comprises: calculating an ideal gain setting that corresponds to a ratio of a maximum signal level (MAX) and the selected exposure threshold (VTH).

6. The method of claim 4, wherein selecting the gain setting further comprising rounding down the ideal gain setting to an appropriate gain setting.

7. A method for balancing an exposure time and a gain for pixels in a pixel array system, the method comprising:
    starting an exposure time interval;
    selecting an exposure threshold that corresponds to a minimum threshold level;
    selecting an exposure time limit that corresponds to a minimum exposure time;
    scanning the signal levels associated with sparse pixels until an initial scan condition is satisfied, wherein the sparse pixels corresponds to a selected group of pixels from the pixel array, wherein the initial scan condition is satisfied when at least one of a first condition and a second condition are satisfied, wherein the first condition is satisfied when at least one of the scanned signal levels exceeds the selected exposure threshold, and wherein the second condition is satisfied when an exposure time exceeds the selected exposure time limit;
    terminating the exposure time interval when a termination condition is satisfied, wherein the termination condition is satisfied when the initial scan condition is satisfied, the first condition fails, and the current exposure time limit corresponds to the last available exposure time limit;
    selecting a higher exposure time limit when the termination condition fails, the initial scan condition is satisfied, the first condition fails, and the current exposure time limit is different from the maximum exposure time limit, wherein that the selected exposure time limit is greater than the previously selected exposure time limit;
    repeating the step of scanning the signal levels associated with sparse pixels until an initial scan condition is satisfied after the higher exposure time limit is selected;
    initiating a final scan procedure when the initial scan condition is satisfied and the first condition is satisfied, wherein the final scan procedure comprises:
        selecting an exposure threshold that is associated with the selected exposure time limit;
        scanning the signal levels associated with sparse pixels until a final scan condition is satisfied, wherein the final scan condition is satisfied when at least one of a third condition and a fourth condition are satisfied, wherein the third condition is satisfied when at least one of the scanned signal levels exceeds the selected exposure threshold, and wherein the second condition is satisfied when the exposure time exceeds an exposure timeout limit; and
        terminating the exposure time interval when the final scan condition is satisfied;
    selecting a gain setting that is associated with the selected exposure threshold when the exposure time interval is terminated.

8. The method of claim 7, further comprising: initializing an index prior to starting the exposure time interval, wherein the index is associated with the selected exposure time limit.

9. The method of claim 8, wherein selecting the higher exposure time limit comprises:
    incrementing the index when the termination condition fails, the initial scan condition is satisfied, the first condition fails, and the current exposure time limit corresponds is different from the last available exposure time limit; and
    selecting the exposure time limit that is identified by the index.

10. The method of claim 9, further comprising: selecting a gain setting that is associated with the selected exposure threshold by the index, wherein the gain setting corresponds to $X^N$, wherein X is a constant and N is the index.

11. The method of claim 7, wherein the steps of scanning the signal levels further comprise:
    selecting a row in the pixel array that includes sparse pixels during the exposure time interval;
    comparing the signal levels of the sparse pixels in the selected row to the minimum exposure threshold;
    comparing the current exposure time to the selected exposure time limit; and
    selecting a next row in the pixel array when the first and second conditions fail, wherein the next row corresponds to a first row in the pixel array when the selected row corresponds to a last row in the pixel array.

12. The method of claim 7, wherein the exposure timeout limit corresponds to one of a maximum time limit for integration in the system, an indexed timeout condition, wherein the indexed timeout condition and the maximum time are different from the selected exposure time limit.

13. A method for balancing an exposure time and a gain for pixels in a pixel array system, the method comprising:
  starting an exposure time interval;
  selecting an exposure threshold that is greater than a minimum threshold level;
  selecting an exposure time limit that corresponds to the selected exposure threshold;
  scanning the signal levels associated with sparse pixels until an initial scan condition is satisfied, wherein the sparse pixels corresponds to a selected group of pixels from the pixel array, wherein the initial scan condition is satisfied when at least one of a first condition and a second condition are satisfied, wherein the first condition is satisfied when at least one of the scanned signal levels exceeds the selected exposure threshold, and wherein the second condition is satisfied when an exposure time exceeds the selected exposure time limit;
  selecting a lower exposure threshold and corresponding exposure time limit when the initial scan condition is satisfied, the first condition fails, and the current exposure time limit is different from the maximum exposure time limit, wherein the selected exposure threshold is less than the previously selected exposure threshold, and the corresponding exposure time limit is greater than the previously selected exposure time limit;
  repeating the step of scanning the signal levels associated with sparse pixels until the initial scan condition is satisfied after the lower exposure threshold and the corresponding exposure time limit are selected;
  initiating a final scan procedure when the initial scan condition is satisfied and the first condition is satisfied, wherein the final scan procedure comprises:
    selecting a higher exposure threshold that is greater than the previously selected exposure threshold;
    scanning the signal levels associated with sparse pixels until a final scan condition is satisfied, wherein the final scan condition is satisfied when at least one of a third condition and a fourth condition are satisfied, wherein the third condition is satisfied when at least one of the scanned signal levels exceeds the selected exposure threshold, and wherein the second condition is satisfied when the exposure time exceeds an exposure timeout limit; and
    terminating the exposure time interval when the final scan condition is satisfied; and
  selecting a gain setting that is associated with the selected exposure threshold when the exposure time interval is terminated.

14. The method of claim 13, further comprising: initializing an index prior to starting the exposure time interval, wherein the index is associated with the selected exposure time limit and the associated exposure threshold.

15. The method of claim 14, wherein selecting the lower exposure threshold and corresponding exposure time comprises:
  incrementing the index when the initial scan condition is satisfied, the first condition fails, and the current exposure time limit is different from the maximum exposure time limit; and
  selecting the exposure time limit and the corresponding exposure time that is identified by the index.

16. The method of claim 14, wherein selecting the higher exposure threshold and corresponding exposure time limit further comprises:
  decrementing the index; and
  selecting the exposure threshold that is identified by the index, wherein the selected exposure threshold is greater than the previously selected exposure threshold.

17. The method of claim 16, further comprising: selecting a gain setting that is associated with the selected index, wherein the gain setting corresponds to $X^N$, wherein X is a constant and N is the index.

18. The method of claim 13, wherein the steps of scanning further comprise:
  selecting a row in the pixel array that includes sparse pixels during the exposure time interval;
  comparing the signal levels of the sparse pixels in the selected row to the selected exposure threshold;
  comparing the current exposure time to the selected exposure time limit; and
  selecting a next row in the pixel array when the first and second conditions fail, wherein the next row corresponds to a first row in the pixel array when the selected row corresponds to a last row in the pixel array.

19. The method of claim 13, wherein the exposure timeout limit corresponds to one of a maximum time limit for integration in the system, an indexed timeout condition, wherein the indexed timeout condition and the maximum time are different from the selected exposure time limit.

20. A method for balancing an exposure time and a gain for pixels in a pixel array system, the method comprising:
  starting an exposure time interval;
  selecting an exposure threshold that corresponds to a minimum threshold level;
  selecting an exposure time limit that is associated with a next exposure threshold that is greater than the minimum threshold level;
  scanning the signal levels associated with sparse pixels until an scan condition is satisfied, wherein the sparse pixels corresponds to a selected group of pixels from the pixel array, wherein the scan condition is satisfied when at least one of a first condition and a second condition are satisfied, wherein the first condition is satisfied when an exposure time exceeds the selected exposure time limit, and wherein the second condition is satisfied when at least one of the scanned signal levels exceeds the selected exposure threshold;
  selecting a higher exposure threshold and another exposure time when the scan condition is satisfied, the first condition fails, and a third condition is satisfied, wherein the third condition is satisfied when the exposure time fails to exceed the previously selected exposure time limit, and the currently selected exposure threshold is different from a maximum exposure threshold;
  repeating the step of scanning the signal levels associated with sparse pixels until the scan condition is satisfied after the higher exposure threshold and the other exposure time limit are selected;
  terminating the exposure time interval when the at least one of the first condition is satisfied, the scan condition is satisfied and the exposure time exceeds the previously selected exposure time limit, and the scan condition is satisfied and the currently selected exposure threshold corresponds to the maximum exposure threshold; and selecting a gain setting that is associated with the selected exposure threshold when the exposure time interval is terminated.

21. The method of claim 20, further comprising: initializing an index to a maximum value prior to starting the exposure time interval, wherein the index is associated with the selected exposure time limit and the selected exposure threshold.

22. The method of claim 20, wherein another index that is associated with the selected exposure threshold is one number greater than the index associated with the selected exposure time limit.

23. The method of claim 22, wherein selecting the higher exposure threshold and another exposure time comprises:
   decrementing the index when the scan condition and the third condition are satisfied;
   selecting the exposure threshold that is identified by the index; and
   selecting the exposure time limit that is identified by one number greater than the index.

24. The method of claim 20, further comprising: selecting a gain setting that is associated with the selected index, wherein the gain setting corresponds to $X^N$, wherein X is a constant and N is the index.

25. The method of claim 20, wherein the step of scanning further comprises:
   selecting a row in the pixel array that includes sparse pixels during the exposure time interval;
   comparing the signal levels of the sparse pixels in the selected row to the selected exposure threshold;
   comparing the current exposure time to the selected exposure time limit; and
   selecting a next row in the pixel array when the first and second conditions fail, wherein the next row corresponds to a first row in the pixel array when the selected row corresponds to a last row in the pixel array.

* * * * *